(12) United States Patent
Zhang et al.

(10) Patent No.: US 11,483,772 B2
(45) Date of Patent: Oct. 25, 2022

(54) DEVICE-TO-DEVICE COMMUNICATION METHOD, APPARATUS, AND DEVICE

(71) Applicant: HUAWEI TECHNOLOGIES CO., LTD., Guangdong (CN)

(72) Inventors: Liangliang Zhang, Beijing (CN); Xiangdong Zhang, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 17/090,789

(22) Filed: Nov. 5, 2020

(65) Prior Publication Data

US 2021/0058867 A1    Feb. 25, 2021

Related U.S. Application Data

(63) Continuation of application No. 16/269,299, filed on Feb. 6, 2019, now Pat. No. 10,863,438, which is a
(Continued)

(51) Int. Cl.
*H04W 52/02*    (2009.01)
*H04W 76/30*    (2018.01)
(Continued)

(52) U.S. Cl.
CPC ....... *H04W 52/0235* (2013.01); *H04W 48/16* (2013.01); *H04W 52/0212* (2013.01);
(Continued)

(58) Field of Classification Search
CPC ........ H04W 52/0235; H04W 52/0212; H04W 76/30; H04W 48/16; H04W 68/02;
(Continued)

(56) References Cited

U.S. PATENT DOCUMENTS

2009/0017844 A1    1/2009  Li et al.
2010/0167743 A1    1/2010  Palanki et al.
(Continued)

FOREIGN PATENT DOCUMENTS

CN    101431790 A    5/2009
CN    101808362 A    8/2010
(Continued)

OTHER PUBLICATIONS

3GPP TS 36.300 V13.4.0 (Jun. 2016), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 1 3)," pp. 1-310.
(Continued)

*Primary Examiner* — Afshawn M Towfighi
(74) *Attorney, Agent, or Firm* — Fish & Richardson P.C.

(57)    ABSTRACT

One example method includes receiving, by a first node, a first message from a second node, wherein the first message is used to page a third node, instruct the third node to access a network, instruct the first node to provide a relay serving for the third node, instruct to set the third node to a low configuration mode, instruct to set the third node to a high configuration mode, or instruct to update system information. The first node can send a second message to a third node, where the second message is used to instruct the third node to access a network, instruct the third node to perform communication with a second node by using the first node, instruct to set the third node to a low configuration mode, instruct to set the third node to a high configuration mode, or instruct the third node to update system information.

22 Claims, 12 Drawing Sheets

Related U.S. Application Data continuation of application No. PCT/CN2016/094692, filed on Aug. 11, 2016.

(51) Int. Cl.
   *H04W 48/16* (2009.01)
   *H04W 68/02* (2009.01)
   *H04W 88/04* (2009.01)
   *H04W 88/08* (2009.01)

(52) U.S. Cl.
   CPC ........... *H04W 68/02* (2013.01); *H04W 76/30* (2018.02); *H04W 88/04* (2013.01); *H04W 88/08* (2013.01); *Y02D 30/70* (2020.08)

(58) Field of Classification Search
   CPC . H04W 88/04; H04W 88/08; H04W 52/0209; H04W 68/025; Y02D 70/00; Y02D 70/20; Y02D 70/446; Y02D 70/21
   See application file for complete search history.

(56) References Cited

U.S. PATENT DOCUMENTS

| | | | |
|---|---|---|---|
| 2011/0292866 A1 | 12/2011 | Zheng et al. | |
| 2012/0238208 A1 | 9/2012 | Bienas et al. | |
| 2013/0044675 A1* | 2/2013 | Zhang | H04B 7/155 370/315 |
| 2013/0083684 A1 | 4/2013 | Yeh et al. | |
| 2014/0342738 A1* | 11/2014 | Ishii | H04W 28/08 455/436 |
| 2015/0071063 A1 | 3/2015 | Zhou et al. | |
| 2015/0098414 A1 | 4/2015 | Kuo | |
| 2016/0212682 A1* | 7/2016 | Chung | H04W 12/06 |
| 2018/0213577 A1* | 7/2018 | Burbidge | H04W 76/10 |

FOREIGN PATENT DOCUMENTS

| | | | |
|---|---|---|---|
| CN | 101820690 A | 9/2010 | |
| CN | 101860961 A | 10/2010 | |
| CN | 101873537 A | 10/2010 | |
| CN | 101998368 A | 3/2011 | |
| CN | 102238722 A | 11/2011 | |
| CN | 103428768 A | 12/2013 | |
| EP | 2403311 A1 | 1/2012 | |
| EP | 2843991 B1 | 11/2018 | |
| JP | 2009206814 | 9/2009 | |
| JP | 2010533436 | 10/2010 | |
| KR | 20080069092 A | 7/2008 | |
| KR | 20150022240 A | 3/2015 | |

OTHER PUBLICATIONS

3GPP TS 36.331 V1 3.2.0 (Jun. 2016), "3rd Generation Partnership Project; Technical Specification Group Radio Access Network; Evolved Universal Terrestrial Radio Access (E-UTRA); Radio Resource Control (RRC); Protocol specification (Release 13)," pp. 1-623.
Extended European Search Report dated May 9, 2019 in corresponding European Patent No. 16912266.0 (10 pages).
Fujitsu "Consideration on the Enhancement of UE-to-Network Relay", 3GPP DRAFT; R2-1 62240, vol. RAN WG2, No. Dubrovnik, Croatia; Apr. 1, 2016, XP051 082020, 3 pages.
Huawei, HiSilicon "General technical consideration on PC5 enhancement for UE-To-NW relay", 3GPP Draft; ☐ R2-163602, vol. RAN WG2, No. Nanjing, China; May 22, 2016, XP051 105047, 3 pages.
International Search Report dated May 4, 2017 in corresponding International Application No. PCT/CN2016/094692.
International Search Report, dated May 4, 2017, in International Application No. PCT/CN2016/094692 (4 pp.).
Nokia Networks "Providing QoS in UE-to-NW Relay scenario", 3GPP DRAFT; S2-152838, vol. SA WG2, No. Sophia Antipolis, France; Aug. 26, 2015, XP051043086, 9 pages.
Office Action issued in Japanese Application No. 2019-506424 dated Feb. 4, 2020, 10 pages (with English translation).
Office Action issued in Korean Application No. 2019-7005993 dated Dec. 19, 2019, 9 pages (with English translation).
RP-160415—Huawei, HiSilicon, "L2 UE-to-Network Relay for E-UTRAN," 3GPP TSG-RAN #71, Goteborg, Sweden, Mar. 7-10, 2016, 4 pages.
Sony "Solution for optimized UE management via Relay", 3GPP DRAFT; S2-161567, vol. SA WG2, No. Sophia Antipolis, France; Apr. 5, 2016, XP051086552, 4 pages.
Written Opinion of the International Searching Authority, dated May 4, 2017, in International Application No. PCT/CN2016/094692 (7 pp.).
ZTE "Discussions on O2O UE-to-network Relay", 3GPP DRAFT; R1-151725, vol. RAN WG1, No. Belgrade, Serbia; Apr. 19, 2015, XP050934586, 6 pages.

* cited by examiner

DEVICE-TO-DEVICE COMMUNICATION METHOD, APPARATUS, AND DEVICE

CROSS-REFERENCE TO RELATED APPLICATIONS

This application is a continuation of U.S. application Ser. No. 16/269,299, filed on Feb. 6, 2019, which is a continuation of International Application No. PCT/CN2016/094692, filed on Aug. 11, 2016. All of the aforementioned patent applications are hereby incorporated by reference in their entireties.

TECHNICAL FIELD

Embodiments of the present application relate to the communications field, and in particular, to a communication method, apparatus, and device.

BACKGROUND

To expand coverage of a network service, a user equipment-to-network relay (UE-to-network relay) technology is introduced in a related art.

In the UE-to-network relay technology, a relay device is usually located within coverage of a base station, but a device that needs to connect to a network may not be located within the coverage of the base station. To enable the device that needs to connect to the network to connect to the base station, the relay device needs to forward data between the base station and the device that needs to connect to the base station. For example, a first node is used as a relay device, and a third node is used as a device that needs to connect to a network. The first node establishes a device-to-device (D2D) connection to the third node. The first node forwards downlink data sent by a base station to the third node, or forwards uplink data sent by the third node to the base station, thereby making it possible to provide a network service for the base station and the third node.

When the third node uses the first node as the relay device to implement communication between the third node and the base station, the D2D connection between the third node and the first node needs to be maintained; in addition, a link between the third node and the base station needs to be maintained. The third node needs to listen to at least system information, a paging message, and the like of the base station periodically when maintaining the link between the third node and the base station. Therefore, power consumption of the third node is relatively high in a D2D communication process.

SUMMARY

To resolve a problem in the related art, embodiments of the present application provide a communication method, apparatus, and device. The technical solutions are as follows:

According to a first aspect, a communication method is provided, and applied to a first node, where the method includes: sending a second message to a third node, where the second message is used to instruct the third node to access a network, or instruct the third node to perform communication with a second node by using the first node, or instruct to set the third node to a low configuration mode, or instruct to set the third node to a high configuration mode, or instruct the third node to update system information; where the second node is a serving station of the first node, or the second node is a serving station of the third node, or the second node is a serving station of the first node and the third node.

When the second message is used to instruct the third node to access the network, the third node can access the network in time according to the second message sent by the first node, and does not need to continuously listen to a network access message sent by the second node. This effectively avoids a process of listening on the second node by the third node, and prevents the third node from generating power consumption for listening.

When the second message is used to instruct the third node to perform communication with the second node by using the first node, the third node can receive information sent by the second node and relayed by the first node, without listening to information sent by the second node or generating power consumption for listening.

When the second message is used to instruct to set the third node to the low configuration mode, the third node does not receive information sent by the second node. Therefore, the third node does not actively listen to the information sent by the second node, and does not generate power consumption for listening.

When the second message is used to instruct to set the third node to the high configuration mode, the third node directly receives information sent by the second node, and does not need to always listen to the information sent by the second node. Therefore, power consumption for listening, caused by listening for a long period of time is also avoided.

When the second message is used to instruct the third node to update the system information, the third node can update the system information according to the second message sent by the first node, and does not need to always listen to the system information sent by the second node. This effectively avoids a process of listening on the second node by the third node, and prevents the third node from generating power consumption for listening.

Because power consumption generated by the third node for listening can be reduced to some extent or avoided by using the foregoing second message indicating various types of content, this resolves a problem of relatively high power consumption generated when the third node needs to periodically listen to a message sent by the second node when the third node performs D2D communication in a D2D communication process.

In a first possible implementation of the first aspect, before the sending a second message to a third node, the method includes: receiving a first message sent by the second node, where the first message is used to indicate that the first message is used to page the third node, or instruct the third node to access the network, or instruct the first node to provide a relay serving for the third node, or instruct to set the third node to the low configuration mode, or instruct to set the third node to the high configuration mode, or instruct to update the system information; and sending the second message to the third node based on the first message. After receiving the first message sent by the second node, the first node can correspondingly send the second message to the third node according to content indicated by the first message. Therefore, duration of listening on the second node by the third node can be reduced to some extent by using the second message, and power consumption generated by the third node for listening is reduced.

With reference to the first possible implementation of the first aspect, in a second possible implementation of the first aspect, the receiving a first message sent by the second node includes: receiving, in a paging period of the third node, the first message sent by the second node; or receiving, in a paging period of the first node, the first message sent by the second node. Because the first node receives, only in the paging period of the first node or the third node, the first message sent by the second node, power consumption of the first node can be reduced.

With reference to the first possible implementation of the first aspect, in a third possible implementation of the first aspect, the sending the second message to the third node includes: sending the second message to the third node when the first message is used to instruct the third node to access the network, where the second message is used to instruct the third node to establish a communication connection to the second node; or sending the second message to the third node when the first message is used to page the third node, where the second message is used to instruct the third node to access the network, or instruct the third node to perform communication with the first node; or sending the second message to the third node when the first message is used to instruct the first node to provide the relay serving for the third node, where the second message is used to instruct the third node to perform communication with the first node; or sending the second message to the third node when the first message is used to instruct to set the third node to the low configuration mode, where the second message is used to instruct to set the third node to the low configuration mode; or sending the second message to the third node when the first message is used to instruct to set the third node to the high configuration mode, where the second message is used to instruct to set the third node to the high configuration mode; or sending the second message to the third node when the first message is used to instruct to update the system information, where the second message is used to instruct the third node to update the system information. After receiving the first message sent by the second node, the first node sends, to the third node, the second message corresponding to the information indicated by the first message, so that the third node can perform a corresponding operation in time according to the information indicated in the first message. Therefore, the third node does not need to continuously listen to the information sent by the second node, and power consumption for listening is reduced.

With reference to the first possible implementation of the first aspect and the third possible implementation of the first aspect, in a fourth possible implementation of the first aspect, when the first message is used to page the third node, the method includes: sending the second message to the third node based on a service priority of the third node when the first message is used to page the third node, where the second message is used to instruct the third node to access the network or instruct the third node to perform communication with the first node.

In a fifth possible implementation of the first aspect, after the sending a second message to a third node, the method further includes: releasing a D2D connection between the first node and the third node; or stopping D2D communication between the first node and the third node; or keeping D2D communication between the first node and the third node; or maintaining a D2D connection between the first node and the third node; or suspending a D2D connection between the first node and the third node. After the second message is sent to the third node, the second node may release, terminate, or suspend the D2D connection between the first node and the third node. This reduces power consumption of the third node in D2D communication. The second node may also keep or maintain the D2D connection, so that the third node can continue to receive information sent by the second node.

In a sixth possible implementation of the first aspect, after the sending a second message to a third node, the method further includes: receiving a third message sent by the third node, where the third message indicates that the third node successfully accesses the network, or indicates that the third node is successfully paged, or indicates that the third node successfully establishes the communication connection to the second node, or indicates that the third node is already set to the high configuration mode, or the third message is used to reply and confirm to perform communication with the first node, or is used to indicate that the third node has updated the system information. After sending the second message to the third node, the first node may determine, according to whether the third message sent by the third node is received, an operation performed by the third node or a current communication mode of the third node. This prevents the first node from repeatedly instructing the third node to perform a same operation, and avoids power consumption generated when the third node performs the repeated operation.

With reference to the sixth possible implementation of the first aspect, in a seventh possible implementation of the first aspect, after the receiving a third message sent by the third node, the method further includes: when the third message is used to reply and confirm to perform communication with the first node, keeping D2D communication between the first node and the third node; or maintaining a D2D connection between the first node and the third node. When the first message replies and confirms to perform communication with the first node, it indicates that the third node needs to continue to perform D2D communication with the first node. In this case, the first node keeps or maintains the D2D connection between the first node and the third node, so that the third node can continue to perform communication with the first node.

In an eighth possible implementation of the first aspect, after the sending a second message to a third node, the method further includes: receiving a fourth message sent by the second node, where the fourth message indicates that the third node successfully accesses the network, or indicates that the third node is successfully paged; or releasing a D2D connection between the first node and the third node; or stopping D2D communication between the first node and the third node; or keeping D2D communication between the first node and the third node; or maintaining a D2D connection between the first node and the third node. If the first node receives the fourth message sent by the second node, it indicates that the third node has established the communication connection to the second node. In this case, the third node generally no longer communicates with the first node, and the first node may release or terminate the D2D connection between the first node and the third node. This reduces power consumption of the third node in D2D communication. The second node may also keep or maintain the D2D connection, so that the third node can directly receive, after the second node stops communication with the first node, the information sent by the second node.

In a ninth possible implementation of the first aspect, after the sending a second message to a third node, the method further includes: sending a fifth message to the second node, where the fifth message instructs to release a configuration related to a D2D connection between the first node and the third node, or instructs to release a D2D connection between the first node and the third node. To avoid that the first node or the third node does not have a right to release the D2D connection between the first node and the third node, the first node may send the fifth message to the second node to instruct the second node to release the D2D connection or the configuration related to the D2D connection. This reduces power consumption of the third node in D2D communication.

With reference to the first possible implementation of the first aspect, in a tenth possible implementation of the first aspect, when the first message is used to instruct the first node to provide the relay serving for the third node, the first node provides a data relay serving for the third node.

In an eleventh possible implementation of the first aspect, the method further includes: receiving a sixth message sent by the third node, where the sixth message is used to indicate that the third node receives a paging message from the first node, or indicate that the third node receives the system information from the first node, or indicate that a mode of the third node is set to the high configuration mode, or indicate that a mode of the third node is set to the low configuration mode; or sending a seventh message to the third node, where the seventh message instructs the third node to receive a paging message from the first node, or instructs the third node to receive the system information from the first node, or instructs to set a mode of the third node to the high configuration mode, or instructs to set a mode of the third node to the low configuration mode. The first node may learn, according to content indicated by the received sixth message sent by the third node, a current communication mode of the third node or an operation currently performed by the third node. This prevents the first node from repeatedly instructing the third node to perform a same operation, and avoids power consumption generated when the third node performs the repeated operation. The first node may send the seventh message to the third node to instruct the third node to perform a corresponding operation, and the third node does not need to listen to the information sent by the second node. This prevents the third node from generating power consumption for listening.

With reference to any one of the first aspect, and the first possible implementation of the first aspect to the eleventh possible implementation of the first aspect, in a twelfth possible implementation of the first aspect, before the first node receives the first message, the first node provides the relay serving for the third node.

With reference to any one of the first aspect, and the first possible implementation of the first aspect to the twelfth possible implementation of the first aspect, in a thirteenth possible implementation of the first aspect, the low configuration mode is at least one of the following: the third node stays within coverage of the first node; or the third node receives only information sent by the first node; or the third node receives only signaling and/or data sent by the first node; or the third node receives only signaling and/or data sent by a D2D communications node; or the third node receives signaling and/or data sent by the first node; or the third node receives signaling and/or data sent by a D2D communications node; or the third node receives a paging message sent by the first node; or the third node receives the system information sent by the first node; or the third node receives a synchronization signal sent by the first node; or the third node does not receive system information sent by a cell; or the third node does not receive a paging message sent by a cell; or the third node does not receive synchronization information sent by a cell; or the third node receives information sent by the first node, but does not perform at least one of the following operations: staying within coverage of a cell, receiving system information sent by a cell, receiving a paging message sent by a cell, receiving a synchronization signal sent by a cell, receiving system information sent by a station, receiving a paging message sent by a station, receiving a synchronization signal sent by a station, a neighboring cell measurement, an intra-frequency cell measurement, and an inter-frequency cell measurement; or the third node receives information sent by a D2D communications node, but does not perform at least one of the following operations: staying within coverage of a cell, receiving system information sent by a cell, receiving a paging message sent by a cell, receiving a synchronization signal sent by a cell, receiving system information sent by a station, receiving a paging message sent by a station, receiving a synchronization signal sent by a station, a neighboring cell measurement, an intra-frequency cell measurement, and an inter-frequency cell measurement; and the high configuration mode includes at least one of the following: the third node stays within coverage of a cell, or receives system information sent by a cell, or receives a synchronization signal sent by a cell, or receives a paging message sent by a cell, or receives system information sent by a station, or receives a synchronization signal sent by a station, or receives a paging message sent by a station, or performs cell selection, or performs cell reselection, or performs a neighboring cell measurement, or performs an intra-frequency cell measurement, or performs an inter-frequency cell measurement. Because the third node in low configuration mode does not receive the information sent by the second node, the third node does not actively listen to the information sent by the second node, but directly receives, after the third node is set to the high configuration mode, the information sent by the second node, and also does not need to listen to, before the third node is set to the high configuration mode, the information sent by the second node.

With reference to any one of the first aspect, and the first possible implementation of the first aspect to the thirteenth possible implementation of the first aspect, in a fourteenth possible implementation of the first aspect, the second message includes at least one of the following: an identifier of the first node, an identifier of the third node, a system information update indication, the system information, a paging indication, a service type of the third node, and the service priority of the third node. After receiving the second message sent by the first node, the third node may select, according to information such as the service type of the third node or the service priority of the third node, whether to use the first node for relaying or access the second node. For example, for a service of a low service priority, the first node may directly provide the relay serving for the third node. This avoids high power consumption generated after the third node is communicatively connected to the second node.

With reference to the fourth possible implementation of the first aspect, in a fifteenth possible implementation of the first aspect, the sending the second message to the third node based on a service priority of the third node includes: sending the second message to the third node when the first message is used to page the third node if the service priority of the third node is a first priority, where the second message is used to instruct the third node to access the network; or sending the second message to the third node when the first message is used to page the third node if the service priority of the third node is a second priority, where the second message is used to instruct the third node to perform communication with the first node, and the first priority is higher than the second priority. After receiving the first message sent by the second node, the first node may select, according to information such as the service type of the third node or the service priority of the third node, whether to provide the relay serving for the third node or instruct the third node to access the second node. For example, for a service of a low service priority, the first node may directly provide the relay serving for the third node. This avoids high power consumption generated after the third node is communicatively connected to the second node.

According to a second aspect, a communication method is provided, and applied to a third node, where the method includes: receiving a second message sent by a first node or a second node, where the second message is used to instruct the third node to access a network, or instruct the third node to perform communication with the first node, or instruct to set the third node to a high configuration mode, or instruct to set the third node to a low configuration mode, or instruct to update system information; and performing communication according to the second message; where the second node is a serving station of the first node, or the second node is a serving station of the third node, or the second node is a serving station of the first node and the third node.

When the second message is used to instruct the third node to access the network, the third node can access the network in time according to the second message sent by the first node, and does not need to continuously listen to a network access message sent by the second node. This effectively avoids a process of listening on the second node by the third node, and prevents the third node from generating power consumption for listening.

When the second message is used to instruct the third node to perform communication with the second node by using the first node, the third node can receive information sent by the second node and relayed by the first node, without listening to information sent by the second node or generating power consumption for listening.

When the second message is used to instruct to set the third node to the low configuration mode, the third node does not receive information sent by the second node. Therefore, the third node does not actively listen to the information sent by the second node, and does not generate power consumption for listening.

When the second message is used to instruct to set the third node to the high configuration mode, the third node directly receives information sent by the second node, and does not need to always listen to the information sent by the second node. Therefore, power consumption for listening, caused by listening for a long period of time is also avoided.

When the second message is used to instruct the third node to update the system information, the third node can update the system information according to the second message sent by the first node, and does not need to always listen to the system information sent by the second node. This effectively avoids a process of listening on the second node by the third node, and prevents the third node from generating power consumption for listening.

Because power consumption generated by the third node for listening can be reduced to some extent or avoided by using the foregoing second message indicating various types of content, this resolves a problem of relatively high power consumption generated when the third node needs to periodically listen to a message sent by the second node when the third node performs D2D communication in a D2D communication process.

In a first possible implementation of the second aspect, the performing communication according to the second message includes: when the second message is used to instruct the third node to access the network, accessing the network, or accessing the second node to perform communication with the second node; or when the second message is used to instruct the third node to perform communication with the first node, performing D2D communication with the first node; or detecting whether the third node has established a D2D connection to the first node, and when the third node has not established a D2D connection to the first node, establishing a D2D connection to the first node, or when the third node has established a D2D connection to the first node, performing D2D communication with the first node; or when the second message instructs to set the third node to the high configuration mode, setting a communication mode of the third node to the high configuration mode; or when the second message instructs to set the third node to the low configuration mode, setting a communication mode of the third node to the low configuration mode; or when the second message instructs the third node to update the system information, listening to the system information, and updating the system information, or setting a communication mode of the third node to the high configuration mode. The third node can determine, by using the information indicated in the second message, whether to establish a communication connection to the second node, whether to set the communication mode to the high configuration mode, or whether to update the system information. Therefore, the third node does not need to continuously listen to the information sent by the second node. This reduces or avoids power consumption generated for listening.

With reference to the first possible implementation of the second aspect, in a second possible implementation of the second aspect, after the receiving a second message sent by a first node, the method further includes: sending a third message to the first node; or sending a third message to the first node if successfully accessing the network within predetermined duration starting from reception of the second message or if successfully establishing a communication connection to the second node, where the third message indicates that the third node successfully accesses the network, or indicates that the third node is successfully paged, or indicates that the third node successfully establishes the communication connection to the second node, or indicates that the third node is already set to the high configuration mode, or is used to reply and confirm to perform communication with the first node, or is used to indicate that the third node has updated the system information. When establishing the connection to the second node or accessing the network within the predetermined duration, the third node may send the third message to the first node, notifying the first node of an operation performed by the third node or a current communication mode. This prevents the first node from repeatedly instructing the third node to perform a same operation, and avoids power consumption generated when the third node performs the repeated operation.

With reference to the second aspect, the first possible implementation of the second aspect, or the second possible implementation of the second aspect, in a third possible implementation of the second aspect, the method further includes: maintaining the D2D connection between the first node and the third node, or releasing the D2D connection between the first node and the third node.

In a fourth possible implementation of the second aspect, the method further includes: before the receiving a second message sent by a first node, the third node is in low configuration mode; or after the receiving a second message sent by a first node, setting a communication mode of the third node to the low configuration mode, or setting the third node to the high configuration mode; or during the receiving a second message sent by a first node, the third node is in low configuration mode. To reduce power consumption of the third node, after receiving the second message sent by the first node, the third node may set the communication mode to the low configuration mode. To ensure communication between the first node and the third node, after receiving the second message sent by the first node, the third node may set the communication mode to the high configuration mode. Because the third node is set to the high configuration mode or the low configuration mode according to the second message, the third node does not need to always listen to the information sent by the second node. This can prevent the third node from generating power consumption for listening.

With reference to the first possible implementation of the second aspect, in a fifth possible implementation of the second aspect, after the listening to the system information, the method further includes: setting the third node to the low configuration mode after updating the system information; or setting the third node to the low configuration mode after updating the system information and the third node satisfies a predetermined condition. To reduce power consumption of the third node, after updating the system information, the third node may set the communication mode to the low configuration mode.

In a sixth possible implementation of the second aspect, the method further includes: sending a sixth message to the first node, where the sixth message is used to indicate that the third node receives a paging message from the first node, or indicate that the third node receives the system information from the first node, or indicate that a mode of the third node is set to the high configuration mode, or indicate that a mode of the third node is set to the low configuration mode; or receiving a seventh message sent by the first node or the second node, where the seventh message is used to instruct the third node to receive a paging message from the first node, or instruct the third node to receive the system information from the first node, or instruct to set a mode of the third node to the high configuration mode, or instruct to set a mode of the third node to the low configuration mode. The first node may learn, according to content indicated by the received sixth message sent by the third node, a current communication mode of the third node or an operation currently performed by the third node. This prevents the first node from repeatedly instructing the third node to perform a same operation, and avoids power consumption generated when the third node performs the repeated operation. The first node may send the seventh message to the third node to instruct the third node to perform a corresponding operation, and the third node does not need to listen to the information sent by the second node. This prevents the third node from generating power consumption for listening.

With reference to any one of the second aspect, and the first possible implementation of the second aspect to the sixth possible implementation of the second aspect, in a seventh possible implementation of the second aspect, the first node is a node providing the relay serving for the third node.

With reference to any one of the second aspect, and the first possible implementation of the second aspect to the seventh possible implementation of the second aspect, in an eighth possible implementation of the second aspect, the low configuration mode is at least one of the following: the third node stays within coverage of the first node; or the third node receives only information sent by the first node; or the third node receives only signaling and/or data sent by the first node; or the third node receives only signaling and/or data sent by a D2D communications node; or the third node receives signaling and/or data sent by the first node; or the third node receives signaling and/or data sent by a D2D communications node; or the third node receives a paging message sent by the first node; or the third node receives the system information sent by the first node; or the third node receives a synchronization signal sent by the first node; or the third node does not receive system information sent by a cell; or the third node does not receive a paging message sent by a cell; or the third node does not receive synchronization information sent by a cell; or the third node receives information sent by the first node, but does not perform at least one of the following operations: staying within coverage of a cell, receiving system information sent by a cell, receiving a paging message sent by a cell, receiving a synchronization signal sent by a cell, receiving system information sent by a station, receiving a paging message sent by a station, receiving a synchronization signal sent by a station, a neighboring cell measurement, an intra-frequency cell measurement, and an inter-frequency cell measurement; or the third node receives information sent by a D2D communications node, but does not perform at least one of the following operations: staying within coverage of a cell, receiving system information sent by a cell, receiving a paging message sent by a cell, receiving a synchronization signal sent by a cell, receiving system information sent by a station, receiving a paging message sent by a station, receiving a synchronization signal sent by a station, a neighboring cell measurement, an intra-frequency cell measurement, and an inter-frequency cell measurement; and the high configuration mode includes at least one of the following: the third node stays within coverage of a cell, or receives system information sent by a cell, or receives a synchronization signal sent by a cell, or receives a paging message sent by a cell, or receives system information sent by a station, or receives a synchronization signal sent by a station, or receives a paging message sent by a station, or performs cell selection, or performs cell reselection, or performs a neighboring cell measurement, or performs an intra-frequency cell measurement, or performs an inter-frequency cell measurement. Because the third node in low configuration mode does not receive the information sent by the second node, the third node does not actively listen to the information sent by the second node, but directly receives, after the third node is set to the high configuration mode, the information sent by the second node, and also does not need to listen to, before the third node is set to the high configuration mode, the information sent by the second node.

With reference to any one of the second aspect, and the first possible implementation of the second aspect to the eighth possible implementation of the second aspect, in a ninth possible implementation of the second aspect, a first message includes at least one of the following: an identifier of the first node, an identifier of the third node, a system information update indication, the system information, a paging indication, a service type of the third node, and a service priority of the third node. After receiving the first message sent by the second node, the first node may select, according to information such as the service type of the third node or the service priority of the third node, whether to provide the relay serving for the third node or instruct the third node to access the second node. For example, for a service of a low service priority, the first node may directly provide the relay serving for the third node. This avoids high power consumption generated after the third node is communicatively connected to the second node.

According to a third aspect, a communication method is provided, and applied to a second node, where the method includes: sending a first message to a first node or a third node, where the first message is used to page the third node, or used to instruct the third node to access a network, or used to instruct the third node to perform communication with the second node, or used to instruct the first node to provide a relay serving for the third node, or used to instruct to set the third node to a high configuration mode, or used to instruct to set the third node to a low configuration mode, or used to instruct to update system information; and performing communication based on the first message; where the first node provides the relay serving for the third node, and the second node is a serving station of the first node, or the second node is a serving station of the third node, or the second node is a serving station of the first node and the third node.

When the first message is used to page the third node, the third node can access the second node in time by receiving the first message directly or relayed by the second node, and does not need to continuously listen to a paging message sent by the second node. This prevents the third node from generating power consumption for listening.

When the first message is used to instruct the third node to access the network, the third node can directly receive the first message directly or relayed by the second node, and does not need to continuously listen to a network access message sent by the second node. This effectively avoids a process of listening on the second node by the third node, and prevents the third node from generating power consumption for listening.

When the first message is used to instruct the third node to perform communication with the second node, the third node can directly receive information sent by the second node, or receive information sent by the second node and relayed by the first node, without listening to the information sent by the second node or generating power consumption for listening.

When the first message is used to instruct the first node to provide the relay serving for the third node, the third node receives information sent by the second node and relayed by the first node, without listening to the information sent by the second node or generating power consumption for listening.

When the first message is used to instruct to set the third node to the high configuration mode, the third node directly receives information sent by the second node, and does not need to always listen to the information sent by the second node. Therefore, power consumption for listening, caused by listening for a long period of time is also avoided.

When the first message is used to instruct to set the third node to the low configuration mode, the third node does not receive information sent by the second node. Therefore, the third node does not actively listen to the information sent by the second node, and does not generate power consumption for listening.

When the first message is used to instruct to update the system information, the third node can update a system by directly receiving the first message sent by the second node or receiving the first message sent by the second node and relayed by the first node, and does not need to always listen to the system information sent by the second node. This effectively avoids a process of listening on the second node by the third node, and prevents the third node from generating power consumption for listening.

Because power consumption generated by the third node for listening can be reduced to some extent or avoided by using the foregoing first message indicating various types of content, this resolves a problem of relatively high power consumption generated when the third node needs to periodically listen to a message sent by the second node when the third node performs D2D communication in a D2D communication process.

In a first possible implementation of the third aspect, the sending a first message to a first node includes: sending the first message in a paging period of the third node, or sending the first message in a paging period of the first node. The second node sends the first message to the first node only in the paging period of the third node or the first node, so that the first node can send a second message to the third node in the paging period of the first node or the third node. This reduces a quantity of times of paging the third node, and reduces power consumption generated by the third node in a paging process.

In a second possible implementation of the third aspect, the method further includes: receiving a tenth message, where the tenth message is used to indicate pairing information between the third node and the first node; and/or sending an eighth message to an MME, where the eighth message is used to notify the MME of information about the third node and information about the first node, and the first node is a relay node of the third node; and/or receiving a ninth message sent by the MME, where the ninth message is used to instruct the second node to page the first node, and the ninth message includes information about the third node and the first node. After the second node obtains the pairing information between the third node and the first node, the MME may be notified, and the MME decides whether to instruct the second node to page the first node.

In a third possible implementation of the third aspect, the method further includes: sending a fourth message to the first node, where the fourth message is used to indicate that the third node successfully accesses the network, or indicate that the third node is successfully paged; or releasing a D2D connection between the first node and the third node; or stopping D2D communication between the first node and the third node; or keeping D2D communication between the first node and the third node; or maintaining a D2D connection between the first node and the third node; or receiving a fifth message sent by the first node, where the fifth message is used to instruct to release a configuration related to a D2D connection between the first node and the third node, or instruct to release a D2D connection between the first node and the third node. If the first node receives the fourth message sent by the second node, it indicates that the third node has established a communication connection to the second node successfully. In this case, the first node may release or terminate the D2D connection between the first node and the third node to reduce power consumption of the third node in D2D communication. The second node may also keep or maintain the D2D connection, so that the third node continues to receive information sent by the second node. To avoid that the first node or the third node does not have a right to release the D2D connection between the first node and the third node, when the second node receives the fifth message sent by the first node, the second node may release the D2D connection between the first node and the third node or the configuration related to the D2D connection. This reduces power consumption of the third node in D2D communication.

With reference to any one of the third aspect, and the first possible implementation of the third aspect to the third possible implementation of the third aspect, in a fourth possible implementation of the third aspect, the second node is the serving station of the first node, or the second node is the serving station of the third node, or the second node is the serving station of the first node and the third node; and before the first node receives the first message, the first node provides the relay serving for the third node.

With reference to any one of the third aspect, and the first possible implementation of the third aspect to the fourth possible implementation of the third aspect, in a fifth possible implementation of the third aspect, the first message includes at least one of the following: an identifier of the first node, an identifier of the third node, a system information update indication, the system information, a paging indication, a service type of the third node, and a service priority of the third node. After receiving the first message sent by the second node, the first node may select, according to information such as the service type of the third node or the service priority of the third node, whether to provide the relay serving for the third node or instruct the third node to access the second node. For example, for a service of a low service priority, the first node may directly provide the relay serving for the third node. This avoids high power consumption generated after the third node is communicatively connected to the second node.

According to a fourth aspect, a communications apparatus is provided, and applied to a first node, where the communications apparatus includes at least one unit, and the at least one unit correspondingly implements the communication method provided by any one of the first aspect or the possible implementations of the first aspect.

According to a fifth aspect, a communications apparatus is provided, and applied to a third node, where the communications apparatus includes at least one unit, and the at least one unit correspondingly implements the communication method provided by any one of the second aspect or the possible implementations of the second aspect.

According to a sixth aspect, a communications apparatus is provided, and applied to a second node, where the communications apparatus includes at least one unit, and the at least one unit correspondingly implements the communication method provided by any one of the third aspect or the possible implementations of the third aspect.

According to a seventh aspect, a first node is provided, where the first node includes a processor, a memory, and a transceiver, where the memory is configured to store one or more instructions, the instruction is configured to be executed by the processor, and the instruction correspondingly implements the communication method provided by any one of the first aspect or the possible implementations of the first aspect.

According to an eighth aspect, a third node is provided, where the third node includes a processor, a memory, and a transceiver, where the memory is configured to store one or more instructions, the instruction is configured to be executed by the processor, and the instruction correspondingly implements the communication method provided by any one of the second aspect or the possible implementations of the second aspect.

According to a ninth aspect, a second node is provided, where the second node includes a processor, a memory, and a transceiver, where the memory is configured to store one or more instructions, the instruction is configured to be executed by the processor, and the instruction correspondingly implements the communication method provided by any one of the third aspect or the possible implementations of the third aspect.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may derive other drawings from these accompanying drawings without creative efforts.

DESCRIPTION OF EMBODIMENTS

The technical solutions according to embodiments of the present application are clearly described in the following with reference to the accompanying drawings. Apparently, the described embodiments are merely some but not all of the embodiments of the present application. All other embodiments obtained by a person of ordinary skill in the art based on the embodiments of the present application without creative efforts shall fall within the protection scope of the present application.

Figure 1:
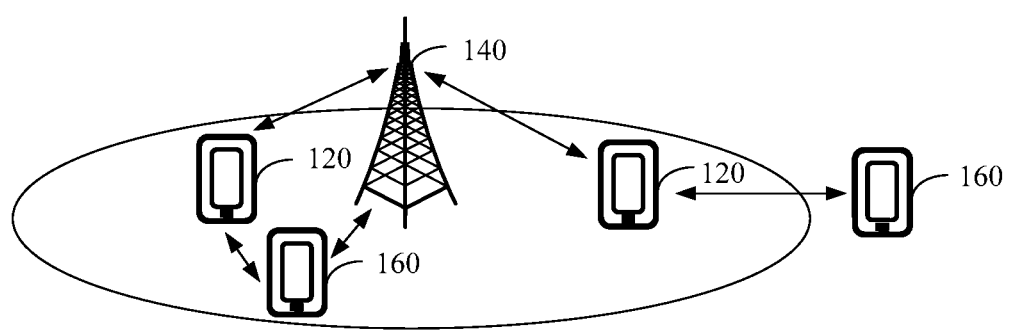
FIG. 1 is a schematic structural diagram of a communications system according to an example embodiment of the present application.

Referring to FIG. 1, FIG. 1 is a schematic structural diagram of a communications system according to an example embodiment of the present application. The communications system includes a first node 120, a second node 140, and a third node 160.

The first node 120 is a relay node of the third node 160.

The second node 140 is a network element interacting with the first node 120 in the system.

Optionally, the second node 140 may be, for example, a base station, for example, an evolved NodeB (eNB or e-NodeB) in Long Term Evolution (LTE), or the second node 140 is a NodeB in Wideband Code Division Multiple Access (WCDMA), or the second node 140 is a base transceiver station (BTS) in a Global System for Mobile Communications (GSM) or Code Division Multiple Access (CDMA).

Optionally, the second node 140 is a serving station of the first node 120, or the second node 140 is a serving station of the third node 160, or the second node 140 is a serving station of the first node 120 or the third node 160.

The third node 160 may be located within coverage 180 of the second node 140, or may be located beyond coverage 180 of the second node 140.

When the third node 160 is located within the coverage of the second node 140, the first node 120 may provide the relay serving for the third node 160, or the third node 160 may directly perform communication with the second node 140.

When the third node 160 is located beyond the coverage of the second node 140, the first node 120 provides a relay for the third node 160.

It should be noted that, a prerequisite for providing the relay serving by the first node 120 for the third node is that the first node 120 should be located within the coverage of the second node 140.

The first node 120 performs communication with the third node 160 by using a D2D link.

Optionally, the first node 120 and the third node 160 are electronic devices having wireless network communication capabilities, for example, terminal devices, user equipment, mobile phones, tablet computers, multimedia players, e-book readers, laptop portable computers, or in-vehicle devices.

Optionally, the communications system may include a plurality of second nodes 140, a plurality of first nodes 120, and a plurality of third nodes 160, where one second node 140 may perform data communication with a plurality of first nodes 120 and a plurality of third nodes 160 separately. FIG. 1 shows only one second node 140, two first nodes 120, and two third nodes 160 as an example for description. This is not described again in each embodiment of this application.

Figure 2A:
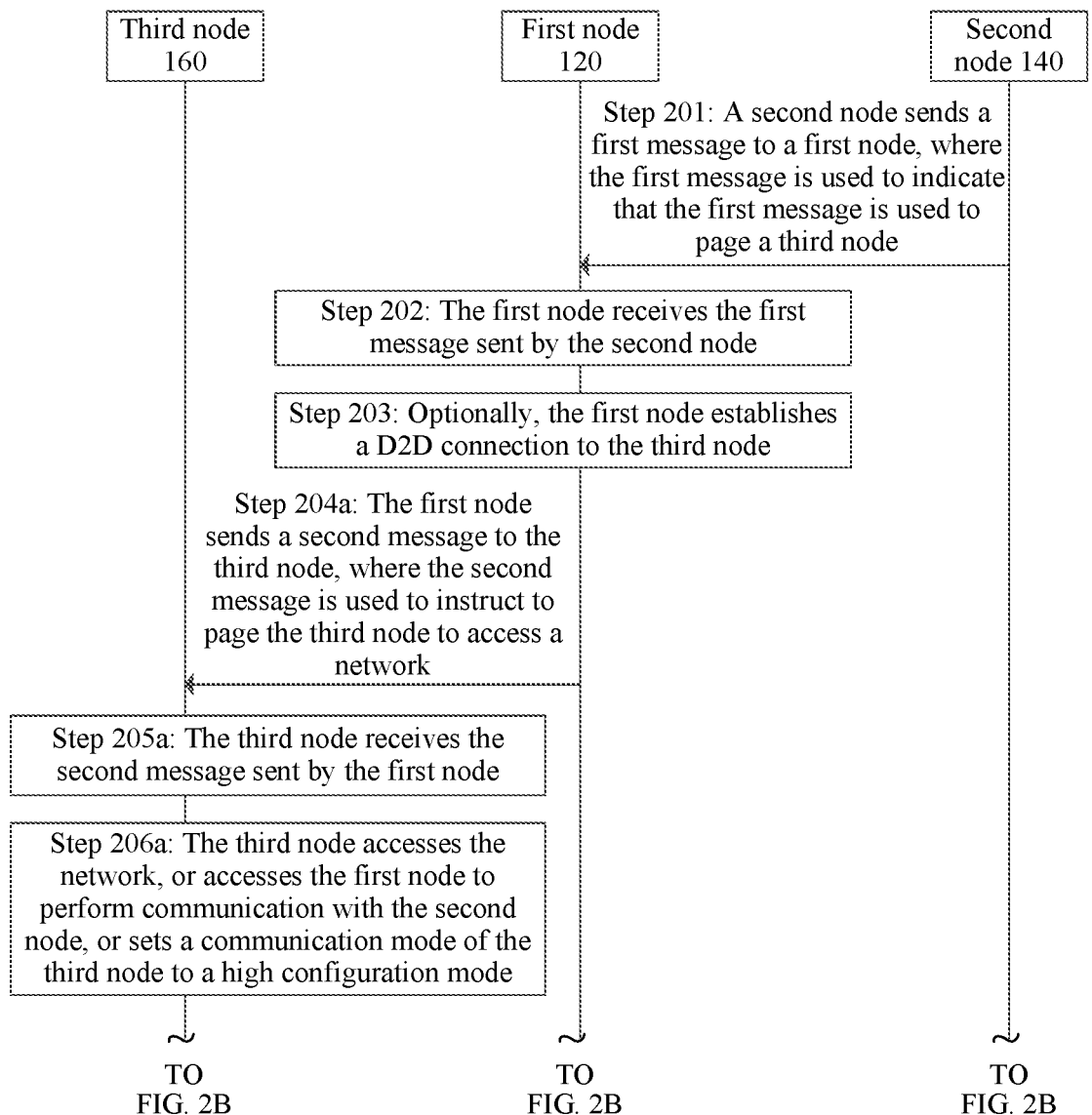
FIG. 2A, FIG. 2B, and FIG. 2C are a flowchart of a communication method according to an example embodiment of the present application.
Figure 2B:
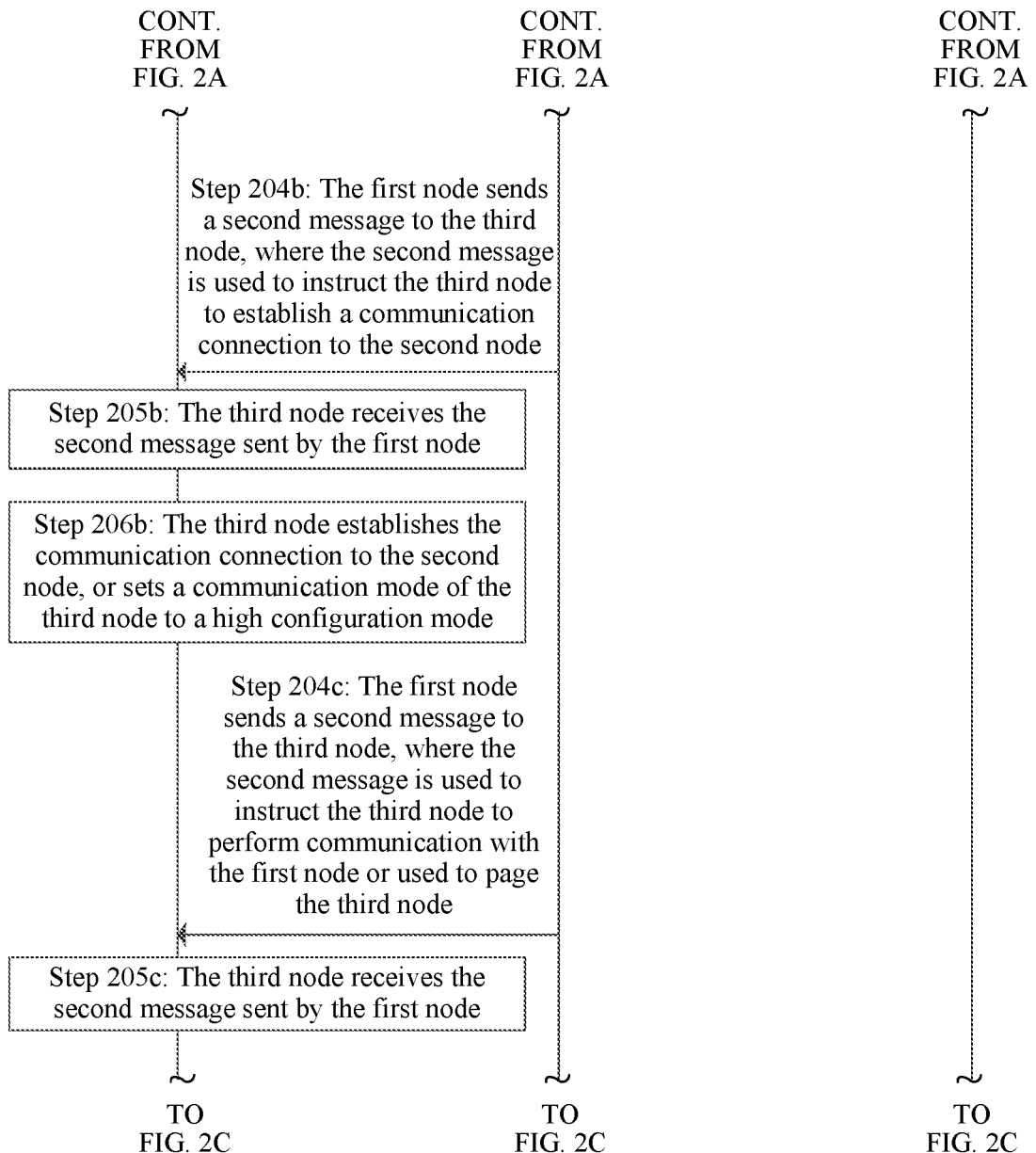
Figure 2C:
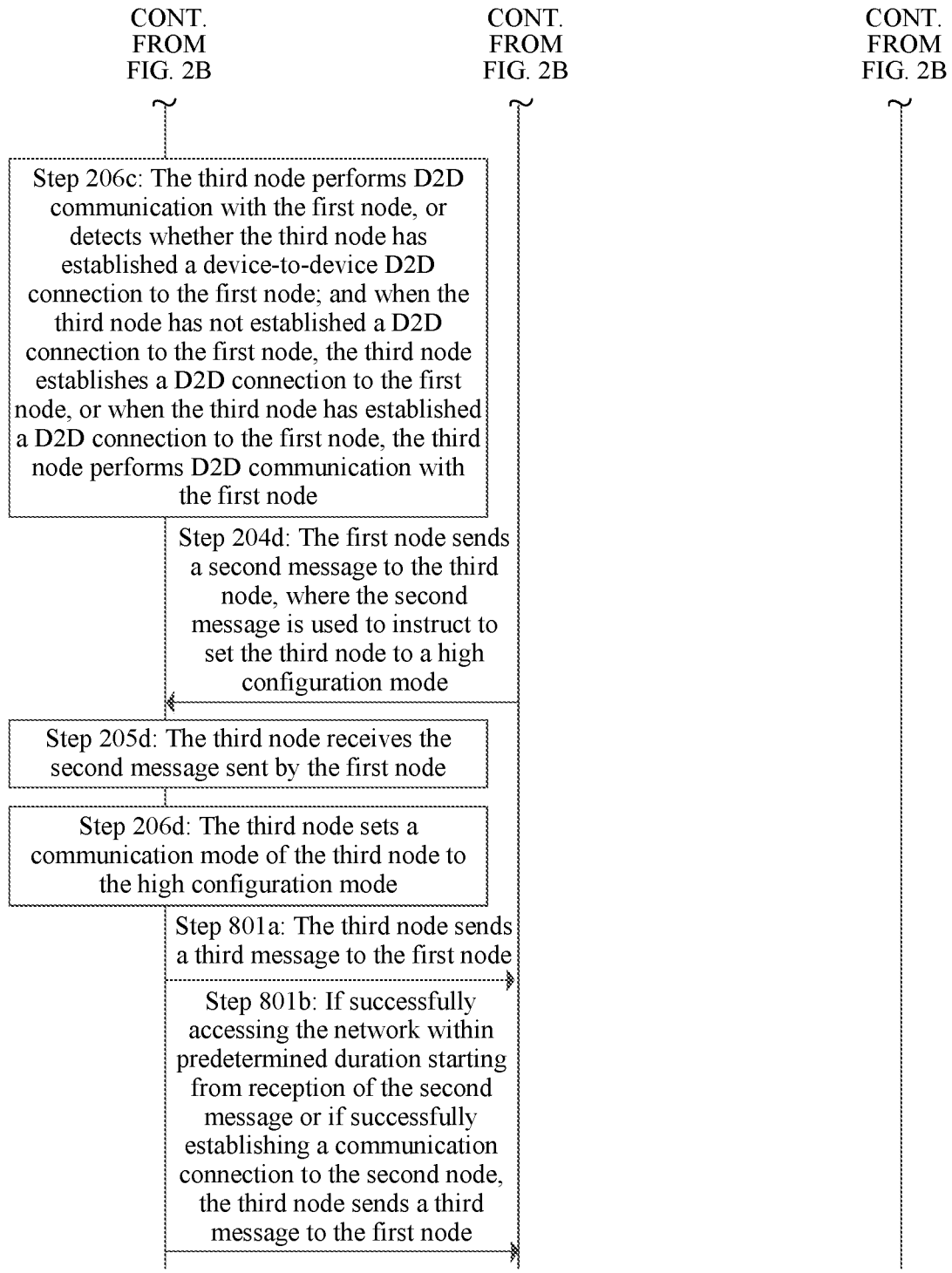

In an actual application, the second node may send a first message for paging the third node to the first node, to page the third node. Referring to FIG. 2A, FIG. 2B, and FIG. 2C, FIG. 2A, FIG. 2B, and FIG. 2C are a flowchart of a communication method according to an example embodiment of the present application. For description of this embodiment, the method is applied to the communications system shown in FIG. 1. The method includes the following steps.

Step 201: A second node sends a first message to a first node, where the first message is used to indicate that the first message is used to page a third node.

Optionally, the first message includes at least one of the following: an identifier of the first node, an identifier of the third node, a system information update indication, system information, a paging indication, a service type of the third node, and a service priority of the third node. The first message carries fields related to the third node, for example, a master system block (MIB), and a system information block (SIB).

Optionally, when sending the first message to the first node, the second node may send the first message in a paging period of the third node, or send the first message in a paging period of the first node.

Step 202: The first node receives the first message sent by the second node.

Optionally, before the first node receives the first message, the first node provides a relay serving for the third node.

Because the first message received by the first node is used to page the third node, the first node needs to notify the third node. Optionally, in this case, the first node has established a D2D connection to the third node.

Step 203: Optionally, the first node establishes a D2D connection to the third node.

After receiving the first message, the first node detects whether the first node has established a D2D connection to the third node, and if the first node has established a D2D connection to the third node, may not perform step 203. However, if the first node has not established a D2D connection to the third node, the first node first needs to establish a D2D connection to the third node.

Optionally, that the first node has established a D2D connection to the third node indicates that the first node stores a configuration related to D2D communication, and/or that the first node stores context information related to D2D communication.

Optionally, that the first node has established a D2D connection to the third node indicates that the second node stores a configuration related to D2D communication, and/or that the second node stores context information related to D2D communication.

Optionally, that the first node has established a D2D connection to the third node indicates that both the first node and the second node store configurations related to D2D communication performed with the first node and the third node, and that both the first node and the second node store context information related to D2D communication performed with the first node and the third node.

Obviously, step 203 may also be performed before step 201, or after step 201 and before step 202. In this embodiment, a sequence between step 203 and step 201 and step 202 is not limited.

When the first message is used to page the third node, and the first node communicates with the third node by using the first message, at least the following four cases may be included.

First Case:

Step 204a: The first node sends a second message to the third node, where the second message is used to instruct the third node to access a network.

Optionally, the second message is used to page the third node to access the network, or is used to instruct the third node to access the network.

Specifically, after receiving the first message, the first node sends the second message to the third node.

After step 204a, that is, after the first node sends the second message to the third node, the first node may release the D2D connection between the first node and the third node; or stop D2D communication between the first node and the third node; or keep D2D communication between the first node and the third node; or maintain the D2D connection between the first node and the third node; or suspend the D2D connection between the first node and the third node.

Step 205a: The third node receives the second message sent by the first node.

Step 206a: The third node accesses the network, or accesses the first node to perform communication with the second node, or sets a communication mode of the third node to a high configuration mode.

After receiving the second message, the third node accesses the network, or accesses the first node to perform communication with the second node, or sets the communication mode of the third node to the high configuration mode.

The high configuration mode includes at least one of the following:

the third node stays within coverage of a cell, or receives system information sent by a cell, or receives a synchronization signal sent by a cell, or receives a paging message sent by a cell, or receives system information sent by a station, or receives a synchronization signal sent by a station, or receives a paging message sent by a station, or performs cell selection, or performs cell reselection, or performs a neighboring cell measurement, or performs an intra-frequency cell measurement, or performs an inter-frequency cell measurement.

In other words, usually the third node in high configuration mode directly communicates with a station, where the station may be a base station or may be the second node or the like. Alternatively, usually the third node in high configuration mode directly communicates with a cell, where the cell may be a cell of a station or may be, for example, a cell of the second node.

Optionally, before the third node receives the second message sent by the first node, the third node may be in low configuration mode.

The low configuration mode is at least one of the following: the third node stays within coverage of the first node; or the third node receives only information sent by the first node; or the third node receives only signaling and/or data sent by the first node; or the third node receives only signaling and/or data sent by a D2D communications node; or the third node receives signaling and/or data sent by the first node; or the third node receives signaling and/or data sent by a D2D communications node; or the third node receives a paging message sent by the first node; or the third node receives system information sent by the first node; or the third node receives a synchronization signal sent by the first node; or the third node does not receive system information sent by a cell; or the third node does not receive a paging message sent by a cell; or the third node does not receive synchronization information sent by a cell; or the third node receives information sent by the first node, but does not perform at least one of the following operations: staying within coverage of a cell, receiving system information sent by a cell, receiving a paging message sent by a cell, receiving a synchronization signal sent by a cell, receiving system information sent by a station, receiving a paging message sent by a station, receiving a synchronization signal sent by a station, a neighboring cell measurement, an intra-frequency cell measurement, and an inter-frequency cell measurement; or the third node receives information sent by a D2D communications node, but does not perform at least one of the following operations: staying within coverage of a cell, receiving system information sent by a cell, receiving a paging message sent by a cell, receiving a synchronization signal sent by a cell, receiving system information sent by a station, receiving a paging message sent by a station, receiving a synchronization signal sent by a station, a neighboring cell measurement, an intra-frequency cell measurement, and an inter-frequency cell measurement.

In other words, usually the third node in low configuration mode does not directly communicate with the second node, but communicates with the first node.

When the third node stays within the coverage of the first node, the third node performs at least one or more of the following operations: the third node receives only information sent by the first node; or the third node receives only signaling and/or data sent by the first node; or the third node receives only signaling and/or data sent by a D2D communications node; or the third node receives signaling and/or data sent by the first node; or the third node receives signaling and/or data sent by a D2D communications node; or the third node receives a paging message sent by the first node; or the third node receives system information sent by the first node; or the third node receives a synchronization signal sent by the first node; or the third node does not receive system information sent by a cell; or the third node does not receive a paging message sent by a cell; or the third node does not receive synchronization information sent by a cell; or the third node receives information sent by the first node, but does not perform at least one of the following operations: staying within coverage of a cell, receiving system information sent by a cell, receiving a paging message sent by a cell, receiving a synchronization signal sent by a cell, receiving system information sent by a station, receiving a paging message sent by a station, receiving a synchronization signal sent by a station, a neighboring cell measurement, an intra-frequency cell measurement, and an inter-frequency cell measurement; or the third node receives information sent by a D2D communications node, but does not perform at least one of the following operations: staying within coverage of a cell, receiving system information sent by a cell, receiving a paging message sent by a cell, receiving a synchronization signal sent by a cell, receiving system information sent by a station, receiving a paging message sent by a station, receiving a synchronization signal sent by a station, a neighboring cell measurement, an intra-frequency cell measurement, and an inter-frequency cell measurement.

"Information" in "the third node receives only information sent by the first node" mentioned in this embodiment is signaling and/or data.

It should be noted that, the signaling mentioned in low configuration mode in this embodiment, for example, "receives signaling sent by a D2D communications node", or "receives signaling sent by the D2D communications node", is a paging message, or system information, or a synchronization signal, or a reconfiguration message, or is the second message or a seventh message mentioned in this embodiment. "Signaling" in this embodiment is not limited to the illustrated messages.

It should be noted that, a station in "receiving system information sent by a station", "receiving a paging message sent by a station", or "receiving synchronization sent by a station" mentioned in this embodiment is a base station, for example, an eNB in LTE, a NodeB in WCDMA, or a BTS in GSM or CDMA, or a micro cell. A base station type of a station is not limited in this embodiment.

"Receiving system information sent by a cell" mentioned in this embodiment is equivalent to receiving system information sent by a station, "receiving a paging message sent by a cell" is equivalent to receiving a paging message sent by a station, and "receiving a synchronization signal sent by a cell" is equivalent to receiving a synchronization signal sent by a station.

It should be noted that, "D2D communications node" mentioned in this embodiment is a D2D communications device, for example, including the first node, or another D2D device synchronized with the first node, or a D2D device having a same synchronization source as the first node.

It should be noted that, when the third node does not receive the second message, the third node itself may set the communication mode to the high configuration mode.

Optionally, after step 206*a,* the third node may release the D2D connection between the first node and the third node; or stop D2D communication between the first node and the third node; or keep D2D communication between the first node and the third node; or maintain the D2D connection between the first node and the third node; or suspend the D2D connection between the first node and the third node.

Second Case:

Step 204*b:* The first node sends a second message to the third node, where the second message is used to instruct the third node to establish a communication connection to the second node.

After step 204*b,* that is, after the first node sends the second message to the third node, optionally, the first node may release the D2D connection between the first node and the third node; or stop D2D communication between the first node and the third node; or keep D2D communication between the first node and the third node; or maintain the D2D connection between the first node and the third node; or suspend the D2D connection between the first node and the third node.

Step 205*b:* The third node receives the second message sent by the first node.

Step 206*b:* The third node establishes the communication connection to the second node, or sets a communication mode of the third node to a high configuration mode.

It should be noted that, when the third node does not receive the second message, the third node itself may set the communication mode to the high configuration mode.

Third Case:

Step 204*c:* The first node sends a second message to the third node, where the second message is used to instruct the third node to perform communication with the first node or used to page the third node.

In this case, after sending the second message to the third node, usually the first node continues to maintain the D2D connection between the first node and the third node.

Step 205*c:* The third node receives the second message sent by the first node.

Step 206*c:* The third node performs D2D communication with the first node, or detects whether the third node has established a D2D connection to the first node; and when the third node has not established a D2D connection to the first node, the third node establishes a D2D connection to the first node, or when the third node has established a D2D connection to the first node, the third node performs D2D communication with the first node.

Fourth Case:

Step 204*d:* The first node sends a second message to the third node, where the second message is used to instruct to set the third node to a high configuration mode.

After step 204*d,* that is, after the first node sends the second message to the third node, the first node may release the D2D connection between the first node and the third node; or stop D2D communication between the first node and the third node; or keep D2D communication between the first node and the third node; or maintain the D2D connection between the first node and the third node; or suspend the D2D connection between the first node and the third node.

Step 205*d:* The third node receives the second message sent by the first node.

Step 206*d:* The third node sets a communication mode of the third node to the high configuration mode.

After the third node sets the communication mode of the third node to the high configuration mode, the third node may release the D2D connection between the third node and the first node, or stop D2D communication between the third node and the first node.

It should be noted that, when the third node does not receive the second message, the third node itself may set the communication mode to the high configuration mode.

In conclusion, in the communication method provided by this embodiment of the present application, the first node sends the second message to the third node, where the second message is used to instruct to page the third node to access the network. Therefore, this resolves a problem of relatively high power consumption generated when the third node needs to maintain the connection to the second node to perform D2D communication in a D2D communication process. Especially before the first node sends the second message to the third node, optionally, the first node determines, based on the first message sent by the second node, whether to provide the relay serving for the third node to implement communication between the third node and the second node, or instruct the third node to access the network to directly perform information or service communication with the second node, thereby achieving an objective and an effect of effectively saving power when the third node receives information sent by the base station during D2D communication.

Figure 3:
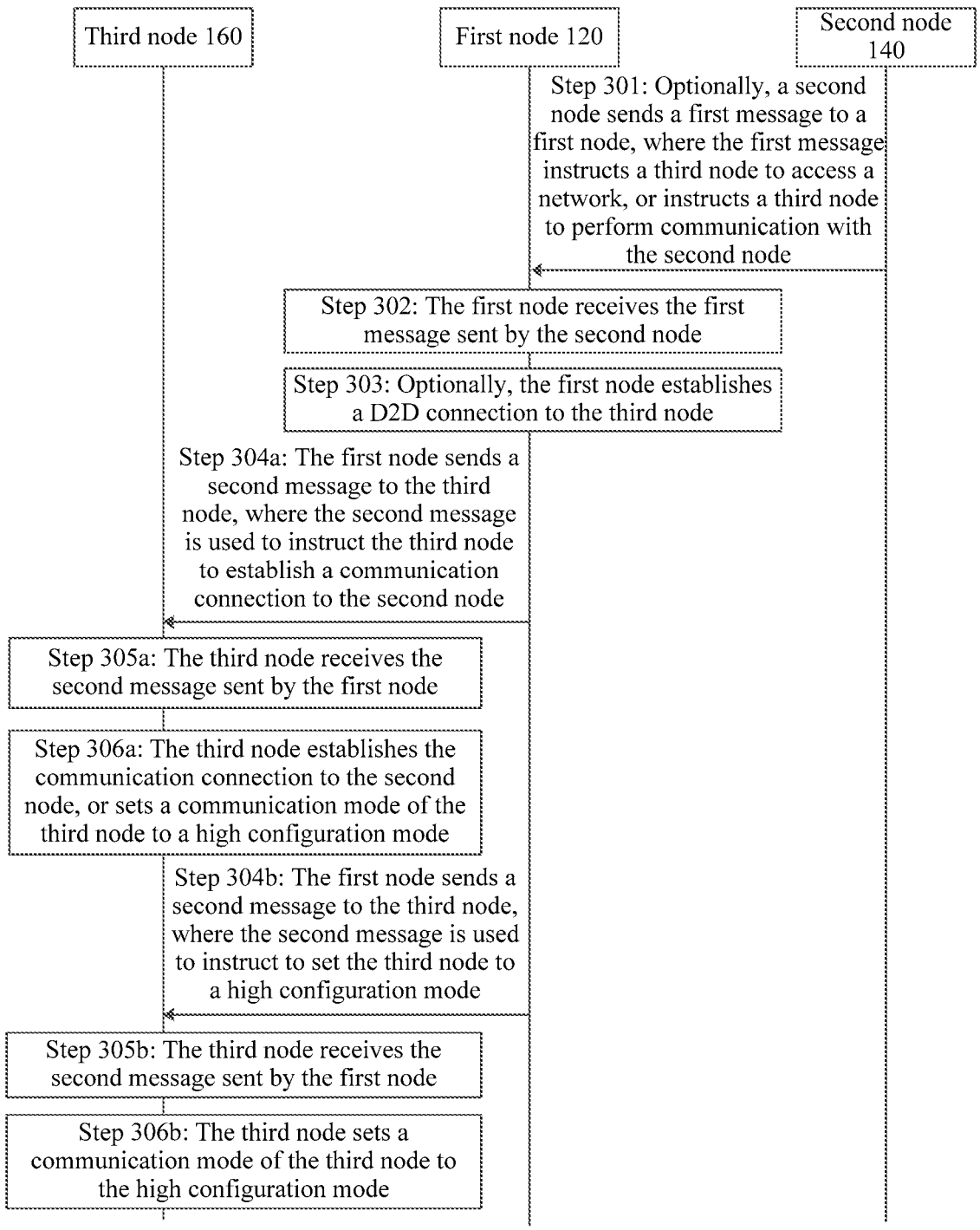
FIG. 3 is a flowchart of a communication method according to another example embodiment of the present application.

In an actual application, the second node may send, to the first node, a first message used to instruct the third node to access the network or instruct the third node to perform communication with the second node, to instruct the third node to access the network. Referring to FIG. 3, FIG. 3 is a flowchart of a communication method according to another example embodiment of the present application. For description of this embodiment, the method is applied to the communications system shown in FIG. 1. The method includes the following steps.

Step 301: Optionally, a second node sends a first message to a first node, where the first message instructs a third node to access a network, or instructs a third node to perform communication with the second node.

Optionally, the first message includes at least one of the following: an identifier of the first node, an identifier of the third node, a system information update indication, system information, a paging indication, a service type of the third node, and a service priority of the third node. The first message carries fields related to the third node, for example, an MIB, or an SIB.

Optionally, when sending the first message to the first node, the second node may send the first message in a paging period of the third node, or send the first message in a paging period of the first node.

Step 302: The first node receives the first message sent by the second node.

Optionally, before the first node receives the first message, the first node provides a relay serving for the third node.

Because the first message received by the first node is used to instruct the third node to access the network, the first node needs to notify the third node. In this case, the first node needs to ensure that a D2D connection is established to the third node.

Step 303: Optionally, the first node establishes a D2D connection to the third node.

After receiving the first message, the first node detects whether the first node has established a D2D connection to the third node, and if the first node has established a D2D connection to the third node, may not perform step 303. However, if the first node has not established a D2D connection to the third node, the first node first needs to establish a D2D connection to the third node.

Obviously, step 303 may also be performed before step 301, or after step 301 and before step 302. In this embodiment, a sequence between step 303 and step 301 and step 302 is not limited.

When the first message is used to instruct the third node to access the network, and the first node communicates with the third node by using the first message, at least the following two cases may be included.

First Case:

Step 304a: The first node sends a second message to the third node, where the second message is used to instruct the third node to establish a communication connection to the second node.

After step 304a, that is, after the first node sends the second message to the third node, optionally, the first node may release the D2D connection between the first node and the third node; or stop D2D communication between the first node and the third node; or keep D2D communication between the first node and the third node; or maintain the D2D connection between the first node and the third node; or suspend the D2D connection between the first node and the third node.

Step 305a: The third node receives the second message sent by the first node.

Step 306a: The third node establishes the communication connection to the second node, or sets a communication mode of the third node to a high configuration mode.

After receiving the second message, the third node accesses the network, or accesses the first node to perform communication with the second node.

Optionally, before the third node receives the second message sent by the first node, the third node may be in low configuration mode.

After the third node receives the second message used to instruct the third node to access the network, the third node may access the network, or establish a communication connection to the second node. In this case, the third node may enter the high configuration mode.

After the third node establishes the communication connection to the second node, or sets the communication mode of the third node to the high configuration mode, optionally, the third node may release the D2D connection between the third node and the first node, or stop D2D communication between the third node and the first node.

It should be noted that, when the third node does not receive the second message, the third node itself may set the communication mode to the high configuration mode.

Second Case:

Step 304b: The first node sends a second message to the third node, where the second message is used to instruct to set the third node to a high configuration mode.

After step 304b, that is, after the first node sends the second message to the third node, the first node may release the D2D connection between the first node and the third node; or stop D2D communication between the first node and the third node; or keep D2D communication between the first node and the third node; or maintain the D2D connection between the first node and the third node; or suspend the D2D connection between the first node and the third node.

Step 305b: The third node receives the second message sent by the first node.

Step 306b: The third node sets a communication mode of the third node to the high configuration mode.

After the third node sets the communication mode of the third node to the high configuration mode, the third node may release the D2D connection between the third node and the first node, or stop D2D communication between the third node and the first node.

It should be noted that, when the third node does not receive the second message, the third node itself may set the communication mode to the high configuration mode.

In conclusion, in the communication method provided by this embodiment of the present application, the first node sends the second message to the third node, where the second message is used to instruct the third node to establish the communication connection to the second node. Therefore, this resolves a problem of relatively high power consumption generated when the third node needs to maintain the connection to the second node to perform D2D communication in a D2D communication process. Especially before the first node sends the second message to the third node, optionally, the first node determines, based on the first message sent by the second node, whether to provide the relay serving for the third node to implement communication between the third node and the second node, or instruct the third node to access the network to directly perform information or service communication with the second node, thereby achieving an objective and an effect of effectively saving power when the third node receives information sent by the base station during D2D communication.

Figure 4A:
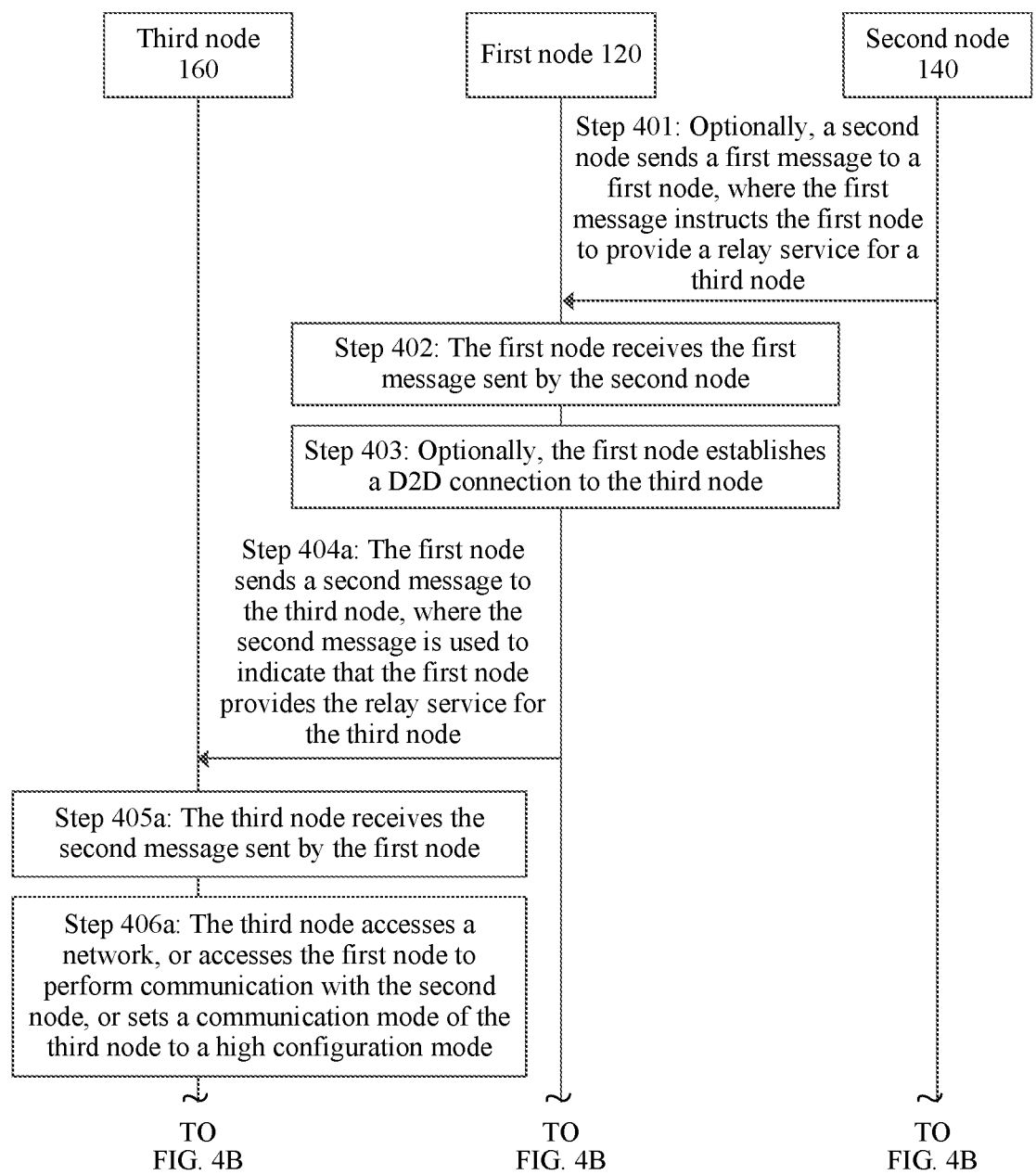
FIG. 4A and FIG. 4B are a flowchart of a communication method according to still another example embodiment of the present application.
Figure 4B:
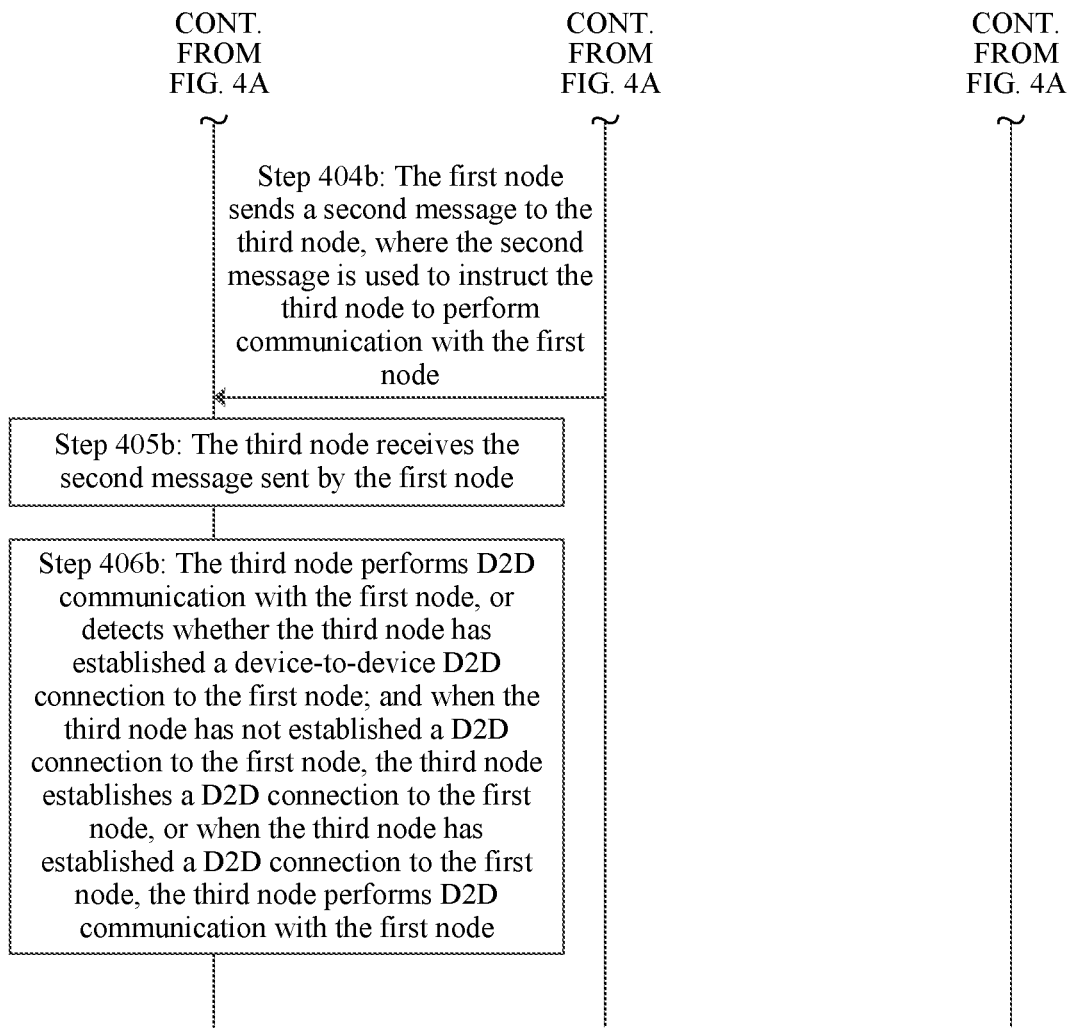

In an actual application, the second node may send, to the first node, a first message used to instruct the first node to provide a relay serving for the third node, to instruct the first node to provide the relay serving for the third node. Referring to FIG. 4A and FIG. 4B, FIG. 4A and FIG. 4B are a flowchart of a communication method according to still another example embodiment of the present application. For description of this embodiment, the method is applied to the communications system shown in FIG. 1. The method includes the following steps.

Step 401: Optionally, a second node sends a first message to a first node, where the first message instructs the first node to provide a relay serving for a third node.

Optionally, the first message includes at least one of the following: an identifier of the first node, an identifier of the third node, a system information update indication, system information, a paging indication, a service type of the third node, and a service priority of the third node. The first message carries fields related to the third node, for example, an MIB, or an SIB.

Optionally, when sending the first message to the first node, the second node may send the first message in a paging period of the third node, or send the first message in a paging period of the first node.

Step 402: The first node receives the first message sent by the second node.

Optionally, before the first node receives the first message, the first node provides the relay serving for the third node.

Because the first message received by the first node is used to instruct the first node to provide the relay serving for the third node, the first node needs to notify the third node. In this case, the first node needs to ensure that a D2D connection is established to the third node.

Step 403: Optionally, the first node establishes a D2D connection to the third node.

After receiving the first message, the first node detects whether the first node has established a D2D connection to the third node, and if the first node has established a D2D connection to the third node, may not perform step 403. However, if the first node has not established a D2D connection to the third node, the first node first needs to establish a D2D connection to the third node.

Obviously, step 403 may also be performed before step 401, or after step 401 and before step 402. In this embodiment, a sequence between step 403 and step 401 and step 402 is not limited.

When the first message is used to instruct the first node to provide the relay serving for the third node, and the first node communicates with the third node by using the first message, at least the following two cases may be included.

First Case:

Step 404*a*: The first node sends a second message to the third node, where the second message is used to indicate that the first node provides the relay serving for the third node.

Specifically, after the first node establishes the D2D connection to the third node, the first node may send the second message to the third node by using a D2D link.

After step 404*a*, that is, after the first node sends the second message to the third node, the first node may release the D2D connection between the first node and the third node; or stop D2D communication between the first node and the third node; or keep D2D communication between the first node and the third node; or maintain the D2D connection between the first node and the third node; or suspend the D2D connection between the first node and the third node.

Step 405*a*: The third node receives the second message sent by the first node.

Step 406*a*: The third node accesses a network, or accesses the first node to perform communication with the second node, or sets a communication mode of the third node to a high configuration mode.

After receiving the second message, the third node accesses the first node to perform communication with the second node.

Optionally, before the third node receives the second message sent by the first node, the third node may be in low configuration mode.

After the third node receives the second message used to instruct the first node to provide the relay serving for the third node, the third node may access the network. In this case, the third node may enter the high configuration mode.

After the third node sets the communication mode of the third node to the high configuration mode, the third node may release the D2D connection between the third node and the first node, or stop D2D communication between the third node and the first node.

It should be noted that, when the third node does not receive the second message, the third node itself may set the communication mode to the high configuration mode.

Second Case:

Step 404*b*: The first node sends a second message to the third node, where the second message is used to instruct the third node to perform communication with the first node.

After step 404*b*, that is, after the first node sends the second message to the third node, the first node may keep D2D communication between the first node and the third node, or maintain the D2D connection between the first node and the third node.

Step 405*b*: The third node receives the second message sent by the first node.

Step 406*b*: The third node performs D2D communication with the first node, or detects whether the third node has established a D2D connection to the first node; and when the third node has not established a D2D connection to the first node, the third node establishes a D2D connection to the first node, or when the third node has established a D2D connection to the first node, the third node performs D2D communication with the first node.

In conclusion, in the communication method provided by this embodiment of the present application, the first node sends the second message to the third node, where the second message is used to instruct the first node to provide the relay serving for the third node. Therefore, this resolves a problem of relatively high power consumption generated when the third node needs to maintain the connection to the second node to perform D2D communication in a D2D communication process. Especially before the first node sends the second message to the third node, optionally, the first node determines, based on the first message sent by the second node, whether to provide the relay serving for the third node to implement communication between the third node and the second node, or instruct the third node to access the network to directly perform information or service communication with the second node, thereby achieving an objective and an effect of effectively saving power when the third node receives information sent by the base station during D2D communication.

Figure 5:
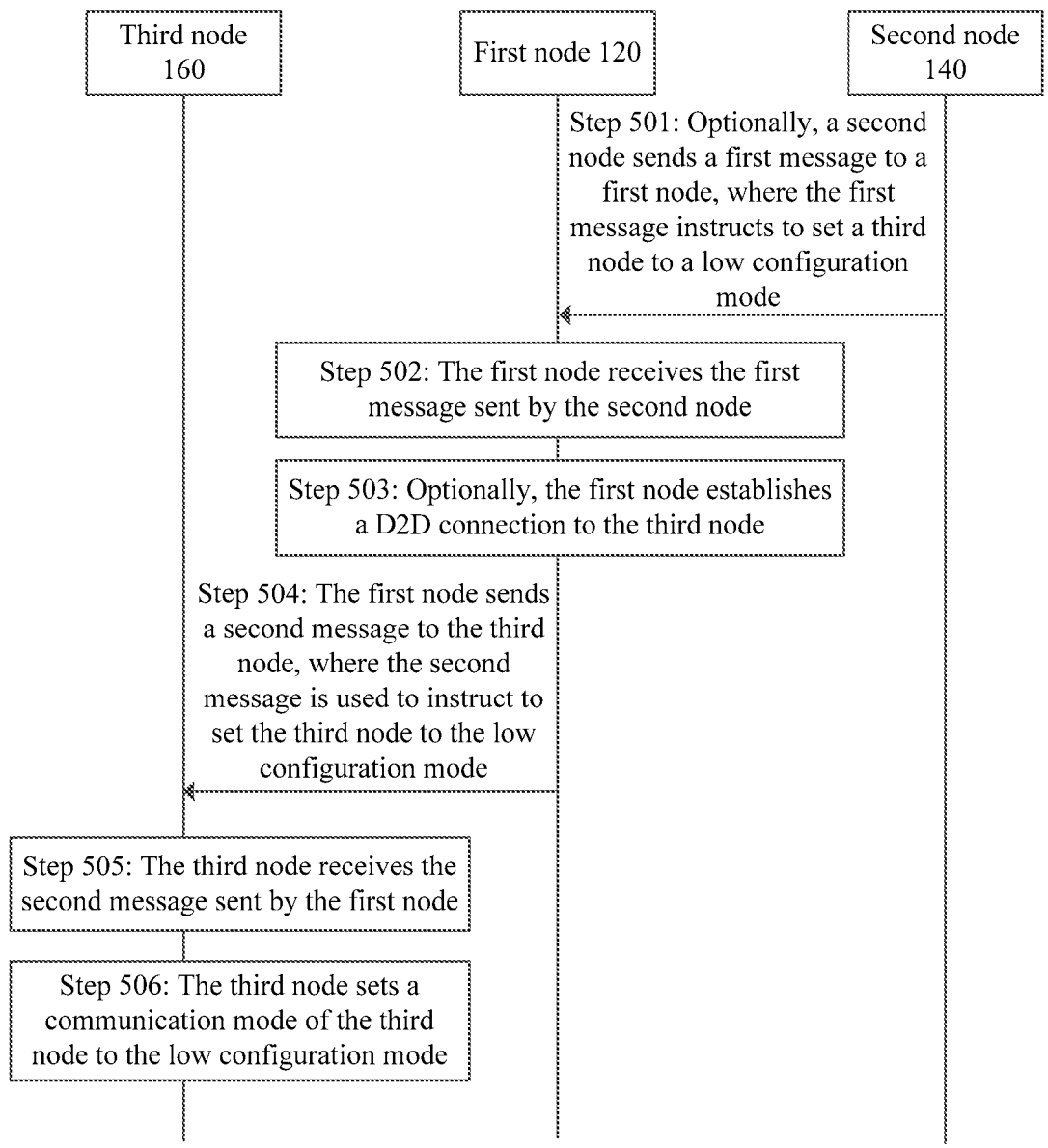
FIG. 5 is a flowchart of a communication method according to still another example embodiment of the present application.

In an actual application, the second node may control the communication mode of the third node. For example, the second node may send, to the first node, a first message used to instruct to set the third node to a low configuration mode, to instruct to set the third node to the low configuration mode. Referring to FIG. 5, FIG. 5 is a flowchart of a communication method according to still another example embodiment of the present application. For description of this embodiment, the method is applied to the communications system shown in FIG. 1. The method includes the following steps.

Step 501: Optionally, a second node sends a first message to a first node, where the first message instructs to set a third node to a low configuration mode.

Optionally, the first message includes at least one of the following: an identifier of the first node, an identifier of the third node, a system information update indication, system information, a paging indication, a service type of the third node, and a service priority of the third node. The first message carries fields related to the third node, for example, an MIB, or an SIB.

Optionally, when sending the first message to the first node, the second node may send the first message in a paging period of the third node, or send the first message in a paging period of the first node.

It should be noted that, when the third node does not receive the first message, the third node itself may set a communication mode to the low configuration mode.

Step 502: The first node receives the first message sent by the second node.

Optionally, before the first node receives the first message, the first node provides a relay serving for the third node.

Because the first message received by the first node is used to instruct to set the third node to the low configuration mode, the first node needs to notify the third node. In this case, the first node needs to ensure that a D2D connection is established to the third node.

Step 503: Optionally, the first node establishes a D2D connection to the third node.

After receiving the first message, the first node detects whether the first node has established a D2D connection to the third node, and if the first node has established a D2D connection to the third node, may not perform step 503.

However, if the first node has not established a D2D connection to the third node, the first node first needs to establish a D2D connection to the third node.

Obviously, step 503 may also be performed before step 501, or after step 501 and before step 502. In this embodiment, a sequence between step 503 and step 501 and step 502 is not limited.

Step 504: The first node sends a second message to the third node, where the second message is used to instruct to set the third node to the low configuration mode.

Specifically, after the first node establishes the D2D connection to the third node, the first node may send the second message to the third node by using a D2D link.

After step 504, that is, after the first node sends the second message to the third node, the first node may keep D2D communication between the first node and the third node, or maintain the D2D connection between the first node and the third node.

Step 505: The third node receives the second message sent by the first node.

Step 506: The third node sets a communication mode of the third node to the low configuration mode.

After the third node sets the communication mode of the third node to the low configuration mode, the third node continues to keep the D2D connection between the third node and the first node.

It should be noted that, when the third node does not receive the first message, the third node itself may set the communication mode to the low configuration mode.

In conclusion, in the communication method provided by this embodiment of the present application, the first node sends the second message to the third node, where the second message is used to instruct to set the third node to the low configuration mode. Therefore, this resolves a problem of relatively high power consumption generated when the third node needs to maintain the connection to the second node to perform D2D communication in a D2D communication process. Especially before the first node sends the second message to the third node, optionally, the first node determines, based on the first message sent by the second node, whether to provide the relay serving for the third node to implement communication between the third node and the second node, or instruct the third node to access the network to directly perform information or service communication with the second node, thereby achieving an objective and an effect of effectively saving power when the third node receives information sent by the base station during D2D communication.

Figure 6:
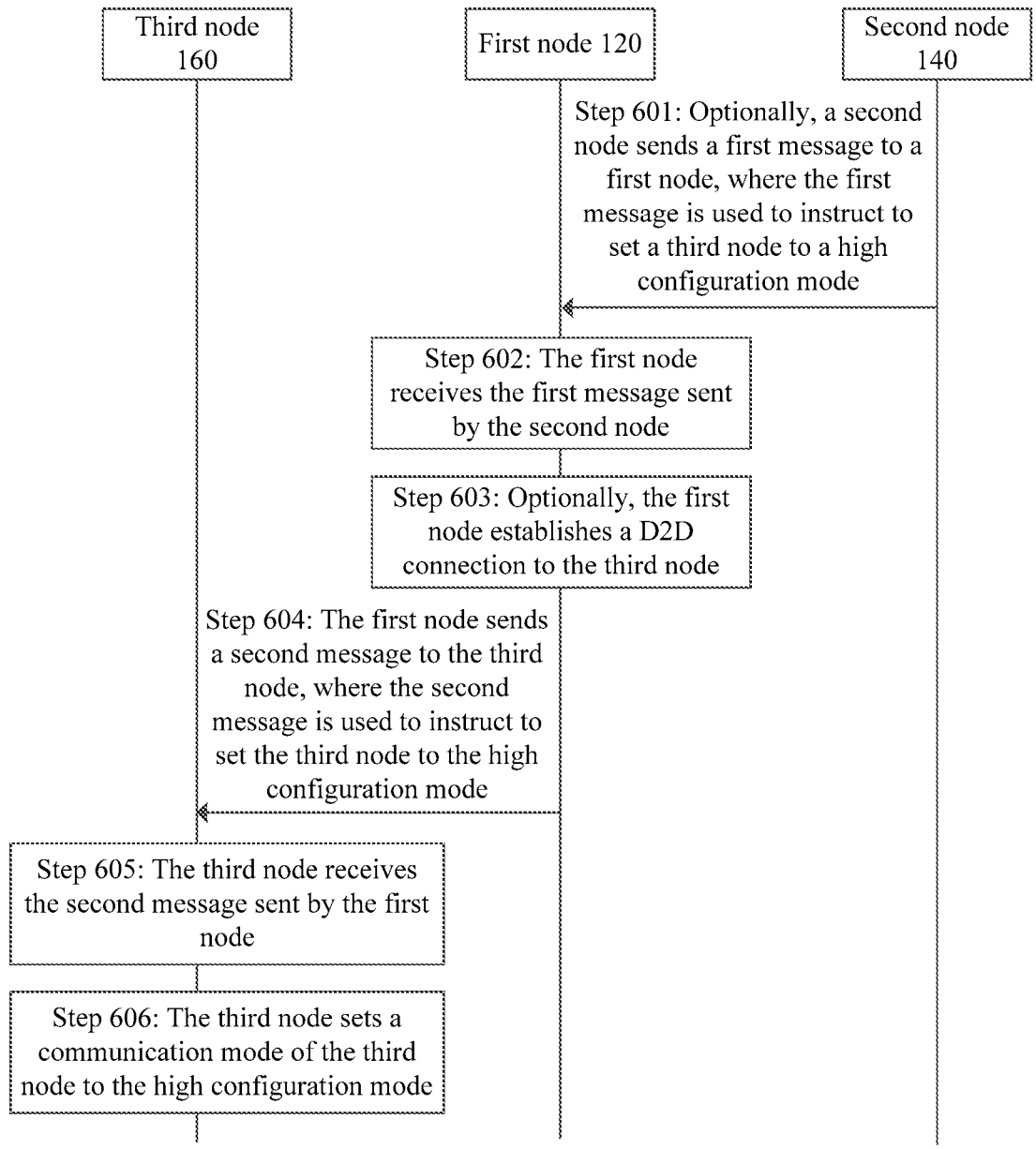
FIG. 6 is a flowchart of a communication method according to still another example embodiment of the present application.

In an actual application, the second node may control the communication mode of the third node. For example, the second node may send, to the first node, a first message used to instruct to set the third node to a high configuration mode, to instruct to set the third node to the high configuration mode. Referring to FIG. 6, FIG. 6 is a flowchart of a communication method according to still another example embodiment of the present application. For description of this embodiment, the method is applied to the communications system shown in FIG. 1. The method includes the following steps.

Step 601: Optionally, a second node sends a first message to a first node, where the first message is used to instruct to set a third node to a high configuration mode.

Optionally, the first message includes at least one of the following: an identifier of the first node, an identifier of the third node, a system information update indication, system information, a paging indication, a service type of the third node, and a service priority of the third node. The first message carries fields related to the third node, for example, an MIB, or an SIB.

Optionally, when sending the first message to the first node, the second node may send the first message in a paging period of the third node, or send the first message in a paging period of the first node.

Step 602: The first node receives the first message sent by the second node.

Optionally, before the first node receives the first message, the first node provides a relay serving for the third node.

Because the first message received by the first node is used to instruct to set the third node to the high configuration mode, the first node needs to notify the third node. In this case, the first node needs to ensure that a D2D connection is established to the third node.

Step 603: Optionally, the first node establishes a D2D connection to the third node.

After receiving the first message, the first node detects whether the first node has established a D2D connection to the third node, and if the first node has established a D2D connection to the third node, may not perform step 603. However, if the first node has not established a D2D connection to the third node, the first node first needs to establish a D2D connection to the third node.

Obviously, step 603 may also be performed before step 601, or after step 601 and before step 602. In this embodiment, a sequence between step 603 and step 601 and step 602 is not limited.

Step 604: The first node sends a second message to the third node, where the second message is used to instruct to set the third node to the high configuration mode.

After step 604, that is, after the first node sends the second message to the third node, the first node may release the D2D connection between the first node and the third node; or stop D2D communication between the first node and the third node; or keep D2D communication between the first node and the third node; or maintain the D2D connection between the first node and the third node; or suspend the D2D connection between the first node and the third node.

Step 605: The third node receives the second message sent by the first node.

Step 606: The third node sets a communication mode of the third node to the high configuration mode.

After the third node sets the communication mode of the third node to the high configuration mode, the third node may release the D2D connection between the third node and the first node, or stop D2D communication between the third node and the first node.

It should be noted that, when the third node does not receive the second message, the third node itself may set the communication mode to the high configuration mode.

In conclusion, in the communication method provided by this embodiment of the present application, the first node sends the second message to the third node, where the second message is used to instruct to set the third node to the high configuration mode. Therefore, this resolves a problem of relatively high power consumption generated when the third node needs to maintain the connection to the second node to perform D2D communication in a D2D communication process. Especially before the first node sends the second message to the third node, optionally, the first node determines, based on the first message sent by the second node, whether to provide the relay serving for the third node to implement communication between the third node and the second node, or instruct the third node to access the network to directly perform information or service communication with the second node, thereby achieving an objective and an effect of effectively saving power when the third node receives information sent by the base station during D2D communication.

Figure 7:
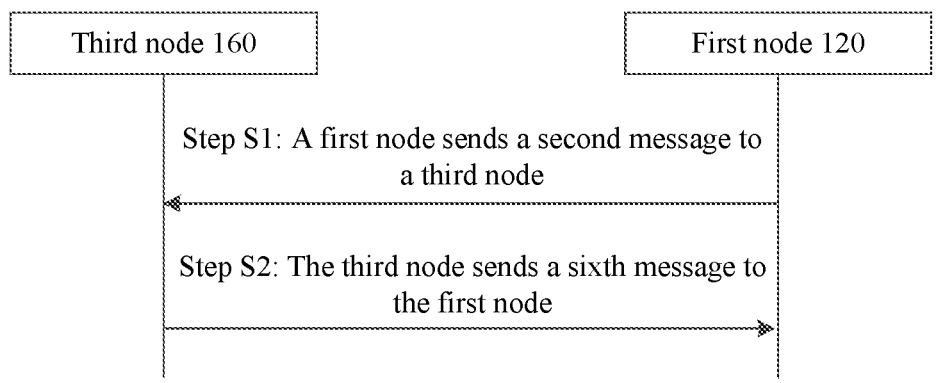
FIG. 7 is a flowchart of a communication method according to still another example embodiment of the present application.

In a possible implementation, FIG. 7 is a flowchart of a communication method according to still another example embodiment of the present application. Referring to FIG. 7, a third node may send a sixth message to a first node, to notify the first node of a communication mode of the third node or instruct the third node to perform a predetermined operation.

Step S1: A first node sends a second message to a third node.

The second message is used to instruct to page the third node to access a network, or instruct the third node to establish a communication connection to a second node, or indicate that the first node provides a relay serving for the third node, or instruct the third node to perform communication with the first node, or instruct to set the third node to a low configuration mode, or instruct to set the third node to a high configuration mode, or instruct the third node to update system information.

Correspondingly, the third node receives the second message sent by the first node.

Step S2: The third node sends a sixth message to the first node.

Optionally, the sixth message is used to indicate that the third node receives a paging message from the first node, or indicate that the third node receives the system information from the first node, or indicate that a mode of the third node is set to the high configuration mode, or indicate that a mode of the third node is set to the low configuration mode.

Correspondingly, the first node receives the sixth message sent by the third node.

It should be noted that, in this embodiment, step S2 may be performed after step 204*a* to step 204*d,* step 304*a* to step 304*b,* step 404*a* to step 404*b,* step 504, or step 604.

Before the second node sends a first message to the first node, if the first node has established a D2D connection to the third node, step S1 may be performed before or after step 201, step 202, step 301, step 302, step 401, step 402, step 501, step 502, step 601, or step 602.

Figure 8:
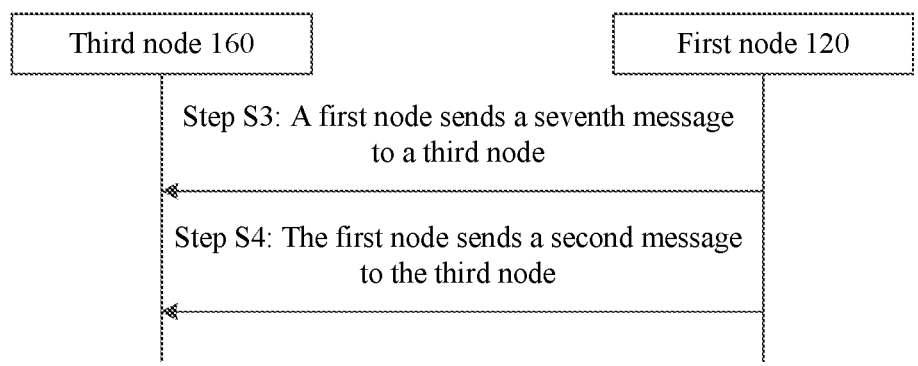
FIG. 8 is a flowchart of a communication method according to still another example embodiment of the present application.

In another possible implementation, FIG. 8 is a flowchart of a communication method according to still another example embodiment of the present application. Referring to FIG. 8, a first node may also send a seventh message to a third node, instructing the third node to change a communication mode or perform a predetermined operation.

Step S3: A first node sends a seventh message to a third node.

Optionally, the seventh message instructs the third node to receive a paging message from the first node, or instructs the third node to receive system information from the first node, or instructs to set a mode of the third node to a high configuration mode, or instructs to set a mode of the third node to a low configuration mode.

Correspondingly, the third node receives the seventh message sent by the first node.

Step S4: The first node sends a second message to the third node.

The second message is used to instruct to page the third node to access a network, or instruct the third node to establish a communication connection to a second node, or indicate that the first node provides a relay serving for the third node, or instruct the third node to perform communication with the first node, or instruct to set the third node to the low configuration mode, or instruct to set the third node to the high configuration mode, or instruct the third node to update system information.

Correspondingly, the third node receives the second message sent by the first node.

It should be noted that, in this embodiment, step S3 may be performed after step 204*a* to step 204*d,* step 304*a* to step 304*b,* step 404*a* to step 404*b,* step 504, or step 604.

In a possible implementation, before the second node sends a first message to the first node, the second node obtains, from an MME, information related to the third node and information related to the first node.

Step S5: Optionally, the second node receives a tenth message.

Optionally, the tenth message is used to indicate pairing information between the third node and the first node, where the pairing information is information that the first node is a relay node of the third node, and the pairing information includes at least one of the following: an identifier of the first node and an identifier of the third node.

Step S6: The second node sends an eighth message to an MME.

Optionally, the eighth message is used to notify the MME of the information about the third node and the information about the first node.

Specifically, the eighth message is used to indicate the pairing information between the third node and the first node, and the pairing information includes the information that the first node is the relay node of the third node, the information about the third node (for example, the identifier of the third node), and the information about the first node (for example, the identifier of the first node). After receiving the eighth message, the MME recognizes the third node according to the information about the third node, recognizes the first node according to the information about the first node, and further determines that the third node and the first node are a pair of D2D communications nodes, where the first node is the relay node of the third node.

When there is a service of the third node, the MME sends a paging message to page the third node. Because the MME knows that the first node is the relay node of the third node, the MME does not directly send a paging message to page the third node, but sends a paging message (for example, a ninth message) to page the first node, where the paging message includes the information about the first node and the information about the third node.

Step S7: The second node receives a ninth message sent by the MME.

Optionally, the ninth message is used to page the first node.

Optionally, the ninth message includes the information about the first node and the information about the third node. The information about the first node is the identifier of the first node, or the identifier of the first node. The information about the third node may be the identifier of the third node, or the identifier of the third node.

Correspondingly, after the second node receives the ninth message sent by the MME, the second node learns the third node that needs to be paged. When the second node learns that the first node is the relay node of the third node, the second node sends a paging message (the first message) to the first node, where the first message is sent in a paging period of the first node; and after the first node receives the first message, the first node confirms, according to content included in the first message, that the second node searches for the third node, and therefore sends the second message to the third node.

For example, when the first message received by the first node is used to page the third node, the first node sends the second message to the third node, where the second message is used to instruct the third node to access the network or instruct the third node to perform communication with the first node.

Optionally, the ninth message is used to instruct the second node to page the third node.

Optionally, the ninth message is used to indicate that the service of the third node needs to be transmitted.

Optionally, the ninth message is used to instruct the second node to page the third node.

Optionally, the ninth message is used to indicate that the service of the third node needs to be transmitted.

After receiving the ninth message sent by the MME, the second node may send the first message to the first node according to content of the ninth message, where the first message is used to indicate that the first message is used to page the third node, or instruct the third node to access the network, or instruct the first node to provide the relay serving for the third node. Step S5, step S6, and step S7 may be performed before step 201, step 301, step 401, step 501, or step 601.

It should be noted that, an implementation sequence of step S5, step S6, and step S7 is not specifically limited in this embodiment.

It should be noted that, in this embodiment, the first message includes at least one of the following: the identifier of the first node, the identifier of the third node, a system information update indication, the system information, a paging indication, a service type of the third node, and a service priority of the third node.

It should be noted that, in this embodiment, the second message includes at least one of the following: the identifier of the first node, the identifier of the third node, the system information update indication, the system information, the paging indication, the service type of the third node, and the service priority of the third node.

The service priority may also be equivalent to QoS of the service.

Figure 9:
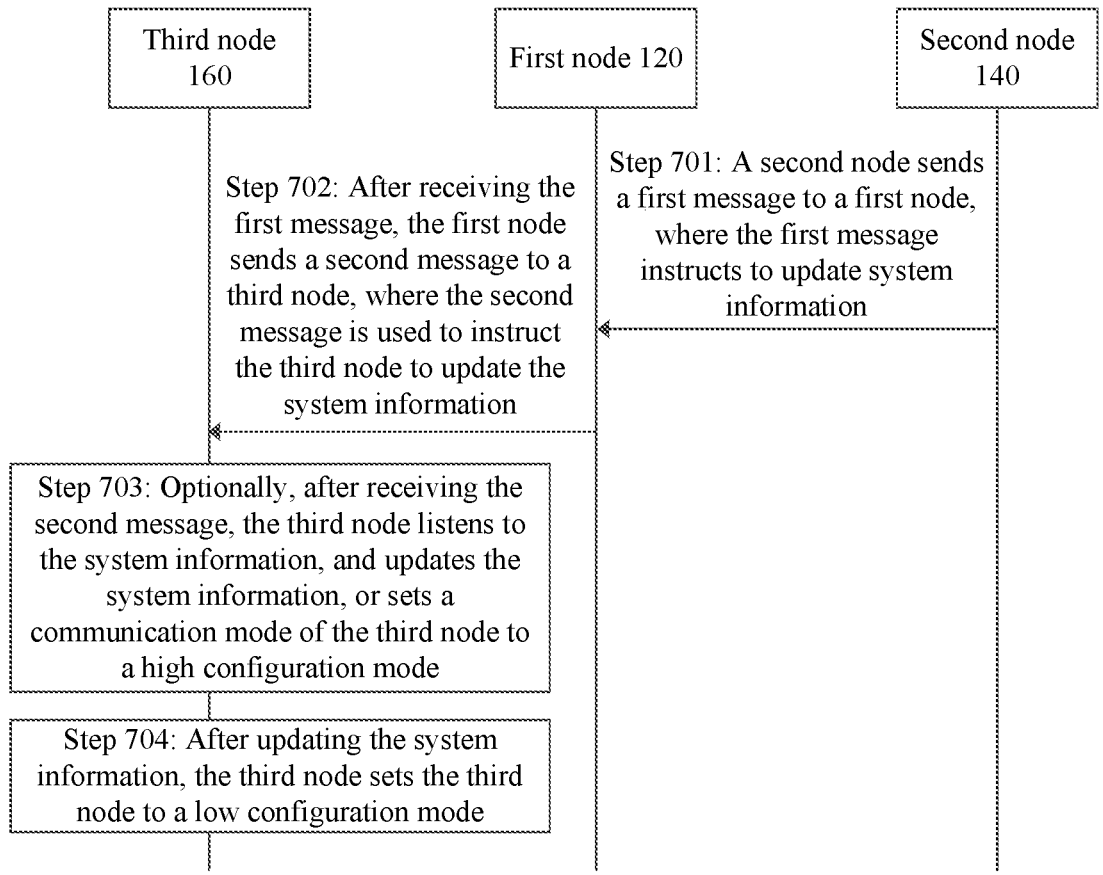
FIG. 9 is a flowchart of a method for updating system information by a third node according to an example embodiment of the present application.

In a possible implementation, the third node may update system information in time when performing D2D communication with the first node. Referring to FIG. 9, FIG. 9 is a flowchart of a method for updating system information by a third node according to an example embodiment of the present application. In this embodiment, the following step 701 to step 704 are performed to implement the system information update.

Step 701: A second node sends a first message to a first node, where the first message instructs to update system information.

The system information includes information related to a third node, for example, an MIB, or an SIB.

Step 702: After receiving the first message, the first node sends a second message to a third node, where the second message is used to instruct the third node to update the system information.

Step 703: Optionally, after receiving the second message, the third node listens to the system information, and updates the system information, or sets a communication mode of the third node to a high configuration mode.

It should be noted that, when the third node does not receive the second message, the third node itself may set the communication mode to the high configuration mode.

Step 704: After updating the system information, the third node sets the third node to a low configuration mode.

Preferably, after the system information is updated, and the third node satisfies a predetermined condition, the third node is set to the low configuration mode.

Optionally, the predetermined condition is that the third node receives an instruction used to instruct to set the communication mode to the low configuration mode.

Optionally, the predetermined condition is that remaining power of the third node is lower than a power threshold.

It should be noted that, step 701 to step 704 may be performed before or after any one of step 201 to step 203, step 204a to step 204d, step 205a to step 205d, and step 206a to step 206d, or may be performed before or after any one of step 301 to step 303, step 304a, step 304b, step 305a, step 305b, step 306a, and step 306b, or may be performed before or after any one of step 401 to step 403, step 404a, step 404b, step 405a, step 405b, step 406a, and step 406b, or may be performed before or after any one of step 501 to step 506, or may be performed before or after any one of step 601 to step 606.

In another possible implementation, still referring to FIG. 2A, FIG. 2B, and FIG. 2C, after the first node sends the second message to the third node, if the first node receives a third message sent by the third node, the following step 801a or step 801b is used to perform an operation on the D2D connection between the first node and the third node.

Step 801a: The third node sends a third message to the first node.

Optionally, if receiving the second message sent by the first node, the third node sends the third message to the first node.

Optionally, after receiving the second message, if the third node successfully accesses the network, or the third node fails to access the network, or the third node successfully establishes a communication connection to the second node, or the third node fails to establish a communication connection to the second node, the third node sends the third message to the first node.

Optionally, if the third node sets the third node itself to the high configuration mode after receiving the second message, the third node sends the third message to the first node.

Optionally, if the third node receives the system information or updates the system information after receiving the second message, the third node sends the third message to the first node.

Optionally, if successfully accessing the network within predetermined duration starting from reception of the second message or if successfully establishing a communication connection to the second node, the third node sends the third message to the first node.

Optionally, if failing to access the network within predetermined duration starting from reception of the second message or if failing to establish a communication connection to the second node, the third node sends the third message to the first node.

"Accessing the network" means that the third node accesses a station or a base station. Particularly, the station may be the second node.

Correspondingly, the first node receives the third message sent by the third node.

It should be noted that, step 801a may be performed after step 205a, step 206a, step 205b, step 206b, step 205c, step 206c, step 205d, step 206d, step 305a, step 306a, step 305b, step 306b, step 405a, step 406a, step 405b, step 406b, step 505, step 506, step 605, or step 606.

Step 801b: If successfully accessing the network within predetermined duration starting from reception of the second message or if successfully establishing a communication connection to the second node, the third node sends a third message to the first node.

Optionally, the third message indicates that the third node successfully accesses the network.

Optionally, the third message indicates that the third node is successfully paged.

Optionally, the third message indicates that the third node successfully establishes a communication connection to the second node.

Optionally, the third message indicates that the third node is already set to the high configuration mode.

Optionally, the third message is used to reply and confirm to perform communication with the first node.

Optionally, the third message indicates that the third node has updated the system information.

Correspondingly, the first node receives the third message sent by the third node.

It should be noted that, step 801*b* may be performed after step 205*a*, step 206*a*, step 205*b*, step 206*b*, step 205*d*, step 206*d*, step 305*a*, step 306*a*, step 305*b*, step 306*b*, step 405*a*, step 406*a*, step 605, or step 606.

Correspondingly, if receiving, within the predetermined duration starting from sending of the second message, the third message sent by the third node, the first node continues to maintain the D2D connection between the first node and the third node; or if receiving, within the predetermined duration starting from sending of the second message, no third message sent by the third node, the first node stops maintaining the D2D connection between the first node and the third node.

It should be noted that, step 801*b* may be performed after step 204*a*, or may be performed after step 304*a*, or may be performed after step 404*a*, or may be performed after step 504, or may be performed after step 604, or may be performed after step 703.

In still another possible implementation, after the first node sends the second message to the third node, the second node may send a fourth message to the first node to notify the first node that the third node successfully accesses the network with the second node or is successfully paged.

The first node receives the fourth message sent by the second node. After receiving the fourth message sent by the second node, the first node uses the following operation steps to perform operations on the D2D connection between the first node and the third node.

Step S7: The second node sends a fourth message to the first node.

Optionally, the fourth message is used to indicate that the third node successfully accesses the network.

Optionally, the fourth message is used to indicate that the third node is successfully paged.

Correspondingly, the first node receives the fourth message sent by the second node.

Optionally, the first node releases the D2D connection between the first node and the third node.

Optionally, the first node stops D2D communication between the first node and the third node.

Optionally, the first node keeps D2D communication between the first node and the third node.

Optionally, the first node maintains the D2D connection between the first node and the third node.

It should be noted that, step S7 may be performed after step 206*a*, step 206*b*, step 206*d*, step 306*a*, step 306*b*, step 406*a*, or step 606.

Alternatively, after the first node sends the second message to the third node, if the first node has no right to perform an operation on the D2D connection between the first node and the third node, the first node may send a fifth message to the second node to instruct the second node to perform an operation on the D2D link between the first node and the third node.

Step S8: The first node sends a fifth message to the second node.

Optionally, the fifth message instructs to release a configuration related to the D2D connection between the first node and the third node.

Optionally, the fifth message instructs to release the D2D connection between the first node and the third node.

Correspondingly, the second node receives the fifth message sent by the first node.

Optionally, the second node releases the configuration related to the D2D connection between the first node and the third node.

Optionally, the second node releases the D2D connection between the first node and the third node.

It should be noted that, step S8 may be performed after step 204*a*, 204*b*, step 204*d*, step 304*a*, step 304*b*, or step 604.

In a possible implementation, when the first message is used to page the third node, if the service priority varies, when the first node sends the second message to the third node, there are at least the following cases but the listed cases are not limited:

The service priority of the third node includes a first priority and a second priority, where the first priority is higher than the second priority. When the service priority of the third node is the first priority, refer to a first case and a third case. When the service priority of the third node is the second priority, refer to a second case and a fourth case.

In the first case, when the service priority of the third node is the first priority, the first node sends the second message to the third node.

Optionally, the second message instructs the third node to access the network.

In the second case, when the service priority of the third node is the second priority, the first node sends the second message to the third node.

Optionally, the second message indicates that the first node provides the relay serving for the second node and the third node.

In the third case, when the first message is used to page the third node, if the service priority of the third node is the first priority, the second message is sent to the third node based on the service priority of the third node, where the second message is used to instruct the third node to access the network.

In the fourth case, when the first message is used to page the third node, if the service priority of the third node is the second priority, the second message is sent to the third node based on the service priority of the third node, where the second message is used to instruct the third node to perform communication with the first node.

Optionally, for example, the first message includes the service priority of the third node, and therefore the first node sends the second message to the third node according to the priority of the third node.

It should be understood that, the term "one" ("a", "an", or "the") of a singular form used in this specification is also intended to include a plural form, unless an exception is clearly supported in the context. It should also be understood that, the term "and/or" used in this specification indicates and includes any or all possible combinations of one or more associated listed items.

Figure 10:
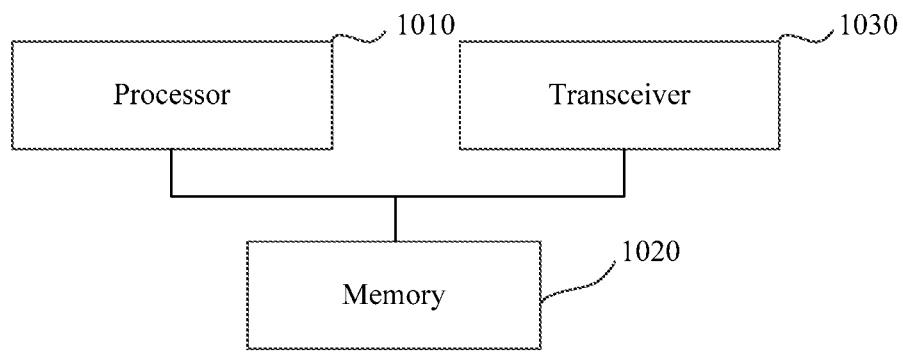
FIG. 10 is a block diagram of a device according to an embodiment of the present application.

Referring to FIG. 10, FIG. 10 shows a block diagram of a device according to an embodiment of the present application. The device may include a processor 1010, a memory 1020, a transceiver 1030, a bus, and other connection apparatuses. The memory 1020 and the transceiver 1030 are connected to the processor 1010 by the bus or in other connection manners. The processor 1010 includes one or more processing cores. The processor 1010 executes various function applications and data processing by running a software program and module. The processor 1010 includes an algorithm logic component, a register component, a control component, and the like. The processor 1010 may be an independent central processing unit, or may be an embedded processor, for example, a microprocessor (MPU), a microcontroller (MCU), or a digital signal processor (DSP).

The memory 1020 may be implemented by any type of volatile or non-volatile storage device or a combination thereof, for example, a static random access memory (SRAM), an electrically erasable programmable read-only memory (EEPROM), an erasable programmable read only memory (EPROM), a programmable read-only memory (PROM), a read only memory (ROM), a magnetic memory, a flash memory, a magnetic disk, or an optical disc. The memory 1020 may be configured to store an instruction that may be executed by a software program and module.

The device may include a mobile device and a network device, where the mobile device is a first node and a third node, and the network device is a second node.

When the device is a mobile device, the device further includes an input/output component, a display device, a microphone, or the like. The input/output component includes a display for displaying information and one or more input devices for inputting information, for example, a touch panel, a physical keyboard, a function key (for example, a volume control key or a power-on/off key), a track ball, a mouse, and a joystick. The display device is configured to display information input by a user or information provided for a user and various menus of the mobile device. The display device may include a display panel 441. Optionally, the display panel may be configured in a form of a liquid crystal display (LCD), an organic light-emitting diode (OLED), or the like. The microphone may provide an audio interface between the user and the device. The display device and the input device are both connected to the processor 1010 by the bus or in other connection manners.

When the device is a network device, the device further includes a power component, a wired or wireless network interface, an input/output (I/O) interface, and the like. The power component is configured to provide a power management function for the device. The wired or wireless network interface is configured to connect the device to a network.

Figure 11:
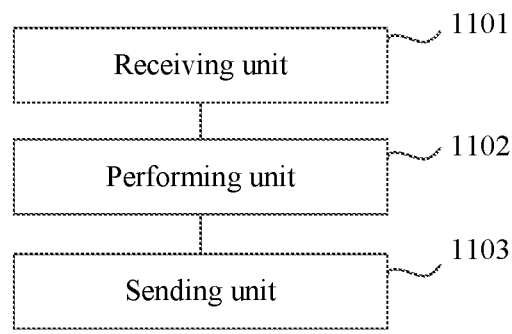
FIG. 11 is a block diagram of a communications apparatus according to an embodiment of the present application.

Referring to FIG. 11, FIG. 11 shows a block diagram of a communications apparatus according to an embodiment of the present application. The communications apparatus may be implemented by software, hardware, or a combination thereof to become all or a part of a first node. The first node may include a receiving unit 1101, a performing unit 1102, and a sending unit 1103.

The receiving unit 1101 is configured to implement a function of the foregoing step 202.

The performing unit 1102 is configured to implement a function of the foregoing step 203.

The sending unit 1103 is configured to implement a function of at least one of the foregoing steps 204*a* to step 204*d*.

For details, refer to the foregoing method embodiments.

In another optional embodiment, the receiving unit 1101 is configured to implement a function of at least one of step 302, step 402, step 502, and step 602.

The performing unit 1102 is configured to implement a function of at least one of step 303, step 403, step 503, and step 603.

The sending unit 1103 is configured to implement a function of at least one of the foregoing step 304*a* to step 304*b*, step 404*a* to step 404*b*, step 504, step 604, step S1, step S3, step S4, and step 702.

It should be noted that, the receiving unit 1101 and the sending unit 1103 may be implemented by using a transceiver of a mobile device; and the performing unit 1102 may be implemented by using a processor of the mobile device.

Figure 12:
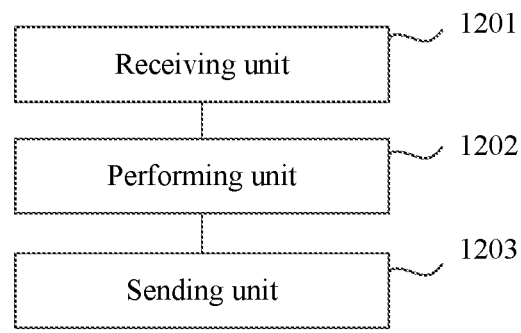
FIG. 12 is a block diagram of a communications apparatus according to another embodiment of the present application.

Referring to FIG. 12, FIG. 12 shows a block diagram of a communications apparatus according to another embodiment of the present application. The communications apparatus may be implemented by software, hardware, or a combination thereof to become all or a part of a third node. The third node may include a receiving unit 1201, a performing unit 1202, and a sending unit 1203.

The receiving unit 1201 is configured to implement a function of at least one of the foregoing steps 205*a* to step 205*d*.

The performing unit 1202 is configured to implement a function of at least one of the foregoing steps 206*a* to step 206*d*.

The sending unit 1203 is configured to implement a function of at least one of the foregoing steps 801*a* to step 801*b*.

For details, refer to the foregoing method embodiments.

In another optional embodiment, the receiving unit 1201 is configured to implement a function of at least one of step 305*a* to step 305*b*, step 405*a* to step 405*b*, step 505, and step 605.

The performing unit 1202 is configured to implement a function of at least one of step 306*a* to step 306*b*, step 406*a* to step 406*b*, step 506, step 606, step 703, and step 704.

The sending unit 1203 is configured to implement a function of the foregoing step S2.

It should be noted that, the receiving unit 1201 and the sending unit 1203 may be implemented by using a transceiver of a mobile device; and the performing unit 1202 may be implemented by using a processor of the mobile device.

Figure 13:
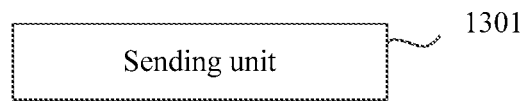
FIG. 13 is a block diagram of a communications apparatus according to still another embodiment of the present application.

Referring to FIG. 13, FIG. 13 shows a block diagram of a communications apparatus according to still another embodiment of the present application. The communications apparatus may be implemented by software, hardware, or a combination thereof to become all or a part of a second node. The second node may include a sending unit 1301.

The sending unit 1301 is configured to implement a function of the foregoing step 201.

For details, refer to the foregoing method embodiments.

In another optional embodiment, the sending unit 1301 is configured to implement a function of at least one of the foregoing step 301, step 401, step 501, step 601, and step 701.

It should be noted that, the sending unit 1301 may be implemented by using a transceiver of a network device.

The sequence numbers of the foregoing embodiments of the present application are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present application, but are not intended to limit the present application. Any modification, equivalent replacement, and improvement made without departing from the spirit and principle of the present application shall fall within the protection scope of the present application.

What is claimed is:

1. A communication method, applied to a first node, wherein the method comprises:
   receiving a first message from a second node, wherein the first message is used to instruct to set a third node to a configuration mode;
   sending a second message to the third node, wherein the second message is used to instruct to set the third node to the configuration mode, wherein the third node in the configuration mode directly communicates with the second node, and wherein the second node is at least one of a serving node of the first node, a serving station of the third node, or a serving station of the first node and the third node; and
   in response to the third node entering the configuration mode, releasing a connection between the third node and the first node.

2. The method according to claim 1, comprising:
   receiving a third message from the second node, wherein the third message is used to instruct the third node to access a network; and
   sending a fourth message to the third node, wherein the fourth message is used to instruct the third node to establish a communication connection to the second node.

3. The method according to claim 1, comprising:
   receiving a third message from the second node, wherein the third message is used to page the third node; and
   sending a fourth message to the third node, wherein the fourth message is used to instruct the third node to access a network, or instruct the third node to perform communication with the first node.

4. The method according to claim 1, comprising:
   receiving a third message from the second node, wherein the third message is used to instruct the first node to provide relay serving for the third node; and
   sending a fourth message to the third node, wherein the fourth message is used to instruct the third node to perform communication with the first node.

5. The method according to claim 1, comprising:
   receiving a third message from the second node, wherein the third message is used to instruct to set the third node to a low configuration mode; and
   sending a fourth message to the third node, wherein the fourth message is used to instruct to set the third node to the low configuration mode.

6. The method according to claim 1, comprising:
   receiving a third message from the second node, wherein the third message is used to instruct to update system information; and
   sending a fourth message to the third node, wherein the fourth message is used to instruct the third node to update the system information.

7. The method according to claim 1, wherein the first message is used to page the third node, and wherein the method comprises:
   sending the second message to the third node based on a service priority of the third node, wherein the second message is used to instruct the third node to access a network or instruct the third node to perform communication with the first node.

8. The method according to claim 1, wherein the method further comprises:
   receiving a third message sent by the third node, wherein the third message is used to indicate that the third node receives a paging message from the first node, indicate that the third node receives system information from the first node, indicate that a mode of the third node is set to the configuration mode, or indicate that a mode of the third node is set to a low configuration mode.

9. The method according to claim 1, wherein the method further comprises:
   sending a third message to the third node, wherein the third message instructs the third node to receive a paging message from the first node, instructs the third node to receive system information from the first node, instructs to set a mode of the third node to the configuration mode, or instructs to set a mode of the third node to a low configuration mode.

10. A first node, comprising:
    at least one processor; and
    a non-transitory computer-readable memory storing instructions, wherein the instructions are executed by the at least one processor to cause the first node to:
    receive a first message from a second node, wherein the first message is used to instruct to set a third node to a configuration mode;
    send a second message to the third node, wherein the second message is used to instruct to set the third node to the configuration mode, wherein the third node in the configuration mode directly communicates with the second node, and wherein the second node is at least one of a serving node of the first node, a serving station of the third node, or a serving station of the first node and the third node; and
    in response to the third node entering the configuration mode, release a connection between the third node and the first node.

11. The first node according to claim 10, wherein the instructions are executed by the at least one processor to cause the first node to:
    receive a third message from the second node, wherein the third message is used to instruct the third node to access a network; and
    send a fourth message to the third node, wherein the fourth message is used to instruct the third node to establish a communication connection to the second node.

12. The first node according to claim 10, wherein the instructions are executed by the at least one processor to cause the first node to:
    receive a third message from the second node, wherein the third message is used to page the third node; and
    send a fourth message to the third node, wherein the fourth message is used to instruct the third node to access a network, or instruct the third node to perform communication with the first node.

13. The first node according to claim 10, wherein the instructions are executed by the at least one processor to cause the first node to:
    receive a third message from the second node, wherein the third message is used to instruct the first node to provide relay serving for the third node; and
    send a fourth message to the third node, wherein the fourth message is used to instruct the third node to perform communication with the first node.

14. The first node according to claim 10, wherein the instructions are executed by the at least one processor to cause the first node to:
receive a third message from the second node, wherein the third message is used to instruct to set the third node to a low configuration mode; and
send a fourth message to the third node, wherein the fourth message is used to instruct to set the third node to the low configuration mode.

15. The first node according to claim 10, wherein the instructions are executed by the at least one processor to cause the first node to:
receive a third message from the second node, wherein the third message is used to instruct to update system information; and
send a fourth message to the third node, wherein the fourth message is used to instruct the third node to update the system information.

16. The first node according to claim 10, wherein the first message is used to page the third node, and wherein the instructions are executed by the at least one processor to cause the first node to:
send the second message to the third node based on a service priority of the third node, wherein the second message is used to instruct the third node to access a network or instruct the third node to perform communication with the first node.

17. The first node according to claim 10, wherein the instructions are executed by the at least one processor to cause the first node to:
receive a third message sent by the third node, wherein the third message is used to indicate that the third node receives a paging message from the first node, indicate that the third node receives system information from the first node, indicate that a mode of the third node is set to the configuration mode, or indicate that a mode of the third node is set to a low configuration mode.

18. The first node according to claim 10, wherein the instructions are executed by the at least one processor to cause the first node to:
send a third message to the third node, wherein the third message instructs the third node to receive a paging message from the first node, instructs the third node to receive system information from the first node, instructs to set a mode of the third node to the configuration mode, or instructs to set a mode of the third node to a low configuration mode.

19. A non-transitory computer readable medium used for a first node, comprising computer instructions; wherein the instructions are executed by at least one processor to cause the first node to perform operations of:
receiving a first message from a second node, wherein the first message is used to instruct to set a third node to a configuration mode;
sending a second message to the third node, wherein the second message is used to instruct to set the third node to the configuration mode, wherein the third node in the configuration mode directly communicates with the second node, and wherein the second node is at least one of a serving node of the first node, a serving station of the third node, or a serving station of the first node and the third node; and
in response to the third node entering the configuration mode, releasing a connection between the third node and the first node.

20. The non-transitory computer readable medium according to claim 19, the operations further comprising:
receiving a third message from the second node, wherein the third message is used to instruct the third node to access a network; and
sending a fourth message to the third node, wherein the fourth message is used to instruct the third node to establish a communication connection to the second node.

21. The non-transitory computer readable medium according to claim 19, the operations further comprising:
receiving a third message from the second node, wherein the third message is used to page the third node; and
sending a fourth message to the third node, wherein the fourth message is used to instruct the third node to access a network, or instruct the third node to perform communication with the first node.

22. The non-transitory computer readable medium according to claim 19, the operations further comprising:
receiving a third message from the second node, wherein the third message is used to instruct the first node to provide relay serving for the third node; and
sending a fourth message to the third node, wherein the fourth message is used to instruct the third node to perform communication with the first node.

* * * * *